United States Patent
Mizuki et al.

(10) Patent No.: US 9,882,977 B2
(45) Date of Patent: *Jan. 30, 2018

(54) INFORMATION-PROCESSING SYSTEM, INFORMATION-PROCESSING DEVICE, STORAGE MEDIUM, AND INFORMATION-PROCESSING METHOD

(71) Applicant: NINTENDO CO., LTD., Kyoto (JP)

(72) Inventors: Kiyoshi Mizuki, Kyoto (JP); Hideto Yuzawa, Kyoto (JP); Shunsaku Kato, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 344 days.

This patent is subject to a terminal disclaimer.

(21) Appl. No.: 13/764,102

(22) Filed: Feb. 11, 2013

(65) Prior Publication Data

US 2013/0325957 A1   Dec. 5, 2013

(30) Foreign Application Priority Data

Jun. 1, 2012   (JP) ................................ 2012-126002

(51) Int. Cl.
*G06F 15/16* (2006.01)
*H04L 29/08* (2006.01)
(Continued)

(52) U.S. Cl.
CPC ...... *H04L 67/104* (2013.01); *G06F 17/30864* (2013.01); *H04L 29/0809* (2013.01); *H04L 51/32* (2013.01)

(58) Field of Classification Search
CPC ....... A63F 13/12; G06Q 10/10; G06O 10/107
(Continued)

(56) References Cited

U.S. PATENT DOCUMENTS 6,005,973 A   12/1999   Seybold et al.
6,900,807 B1 *  5/2005   Liongosari et al. .......... 345/440
(Continued)

FOREIGN PATENT DOCUMENTS

JP   2002-066144   3/2002
JP   2002-259285   9/2002
(Continued)

OTHER PUBLICATIONS

"Xbox Live Connects You", http://www.xbox.com/ja-JP/live-stayconnected, and its English counterpart, 3 pages.
(Continued)

*Primary Examiner* — Dhairya A Patel
(74) *Attorney, Agent, or Firm* — Nixon & Vanderhye PC

(57) ABSTRACT

An exemplary information-processing system includes: an executing unit that executes an application program; and a posted information sharing unit that receives and stores posted information and/or provides the posted information to users, wherein the posted information sharing unit includes: a posted information generating unit that generates the posted information; and a posted information storing unit that stores a plurality items of the posted information, each item of the posted information being stored along with identification information of an application program corresponding to the posted information, the executing unit includes a requesting unit that identifies identification information of an application program being executed and requests the posted information sharing unit to output the posted information, the posted information sharing unit further includes a posted information outputting unit that extracts at least one item of the posted information corresponding to the identified identification information.

23 Claims, 14 Drawing Sheets

(51) Int. Cl.
*G06F 17/30* (2006.01)
*H04L 12/58* (2006.01)

(58) Field of Classification Search
USPC .............. 709/203, 204, 205, 206, 217, 238; 725/30
See application file for complete search history.

(56) References Cited

U.S. PATENT DOCUMENTS

| | | | |
|---|---|---|---|
| 6,904,449 B1* | 6/2005 | Quinones | 709/203 |
| 7,512,655 B2* | 3/2009 | Armstrong et al. | 709/205 |
| 7,742,585 B2 | 6/2010 | Otaka et al. | |
| 7,814,225 B2* | 10/2010 | Rumelhart | 709/238 |
| 7,894,836 B1 | 2/2011 | Fuoss et al. | |
| 8,166,026 B1 | 4/2012 | Sadler | |
| 8,311,382 B1 | 11/2012 | Harwell et al. | |
| 8,347,381 B1 | 1/2013 | Gauvin | |
| 8,715,091 B1* | 5/2014 | Hashimoto et al. | 463/42 |
| 2002/0094069 A1 | 7/2002 | Takahashi et al. | |
| 2004/0176170 A1 | 9/2004 | Eck et al. | |
| 2005/0003850 A1 | 1/2005 | Tsuda et al. | |
| 2005/0144032 A1 | 6/2005 | Shimoda et al. | |
| 2006/0080702 A1* | 4/2006 | Diez | A63F 13/12 725/30 |
| 2006/0160622 A1 | 7/2006 | Lee et al. | |
| 2006/0173929 A1 | 8/2006 | Wilson | |
| 2006/0184617 A1 | 8/2006 | Nicholas et al. | |
| 2006/0232795 A1 | 10/2006 | Tsuboi et al. | |
| 2007/0130150 A1 | 6/2007 | Fowler et al. | |
| 2007/0244987 A1* | 10/2007 | Pedersen et al. | 709/217 |
| 2007/0265972 A1 | 11/2007 | Tsutsui | |
| 2008/0052634 A1 | 2/2008 | Fishkin et al. | |
| 2008/0119281 A1 | 5/2008 | Hirose et al. | |
| 2009/0150486 A1 | 6/2009 | Franco et al. | |
| 2009/0164595 A1 | 6/2009 | Shiigi | |
| 2009/0222811 A1 | 9/2009 | Faus et al. | |
| 2009/0232141 A1 | 9/2009 | Fersman et al. | |
| 2009/0248804 A1 | 10/2009 | Ohtani | |
| 2009/0265427 A1 | 10/2009 | Ankireddyapalli | |
| 2010/0009747 A1* | 1/2010 | Reville | A63F 13/12 463/31 |
| 2010/0035692 A1 | 2/2010 | Reville et al. | |
| 2010/0241580 A1 | 9/2010 | Schleier-Smith | |
| 2010/0293221 A1* | 11/2010 | Sidman et al. | 709/203 |
| 2011/0055821 A1 | 3/2011 | Tanaka et al. | |
| 2011/0060797 A1* | 3/2011 | Balandin et al. | 709/206 |
| 2011/0107382 A1 | 5/2011 | Morris | |
| 2011/0190063 A1 | 8/2011 | Kajii | |
| 2011/0231488 A1 | 9/2011 | Xu | |
| 2011/0237332 A1 | 9/2011 | Abiko | |
| 2011/0252006 A1 | 10/2011 | Smith et al. | |
| 2012/0072871 A1 | 3/2012 | Seo et al. | |
| 2012/0136959 A1 | 5/2012 | Kadam et al. | |
| 2012/0166968 A1 | 6/2012 | Lee et al. | |
| 2012/0178536 A1 | 7/2012 | Oh | |
| 2012/0192170 A1 | 7/2012 | Kobayashi et al. | |
| 2012/0221639 A1 | 8/2012 | Mallet | |
| 2012/0304106 A1 | 11/2012 | Levee | |
| 2013/0144956 A1* | 6/2013 | Sakai | H04L 12/581 709/206 |
| 2013/0212526 A1 | 8/2013 | Park et al. | |
| 2013/0325925 A1 | 12/2013 | Mizuki et al. | |
| 2013/0325958 A1 | 12/2013 | Mizuki et al. | |
| 2013/0326011 A1 | 12/2013 | Mizuki et al. | |
| 2013/0344967 A1 | 12/2013 | Kajii | |
| 2014/0019347 A1 | 1/2014 | Dimaggio | |
| 2014/0143303 A1 | 5/2014 | Wabe et al. | |
| 2015/0334145 A1 | 11/2015 | Jayaram | |

FOREIGN PATENT DOCUMENTS

| | | |
|---|---|---|
| JP | 2009-53904 | 3/2009 |
| JP | 2009-519505 | 5/2009 |
| JP | 2010-046159 | 3/2010 |
| JP | 2010-88695 | 4/2010 |
| JP | 2011-53817 | 3/2011 |
| JP | 2011-200437 | 10/2011 |
| JP | 2011-253452 | 12/2011 |
| JP | 2012-034337 | 2/2012 |
| JP | 2012-053867 | 3/2012 |
| JP | 2012-155406 | 8/2012 |

OTHER PUBLICATIONS

Sep. 20, 2013 Search Report for EP 13155579.9, 7 pages.
"To start Nintendo eShop?" http://www.nindendo.co.jp/3ds/eshop/howto/index.html, and the English translation thereof, 4 pages.
Office Action issued in U.S. Appl. No. 13/768,793 dated Feb. 27, 2015, 14 pages.
Office Action issued in U.S. Appl. No. 13/750,473 dated Feb. 12, 2015, 45 pages.
Extended European Search Report issued in European Application No. EP 13152457 dated Sep. 27, 2013, 6 pages.
Home page, Wikipedia, en.wikipedia.org, May 30, 2012, XP055079714, 1 page.
User agent, Wikipedia, en.wikipedia.org, May 2, 2012, XP055079716, 5 pages.
"Xbox Live Connects You" (JP language), http://www.xbox.com/ja-JP/live/stayconnected, 1 page, retrieved Jan. 9, 2013.
"Xbox Live Connects You" (English language), http://www.xbox.com/en-US/live/stay-connected, 2 pages retrieved Jan. 9, 2013.
Office Action issued in U.S. Appl. No. 13/768,793 dated Jan. 31, 2014, 17 pages.
Office Action issued in U.S. Appl. No. 13/768,793 dated Aug. 15, 2014, 12 pages.
Office Action issued in U.S. Appl. No. 13/768,793 dated May 9, 2013, 12 pages.
U.S. Patent and Trademark Office, "non-final Office Action," issued in connection with U.S. Appl. No. 13/750,473, dated Jan. 11, 2016, 40 pages.
Mizuki et al., Office Action dated Jul. 27, 2016, issued in corresponding U.S. Appl. No. 13/750,473, filed Jan. 25, 2013 (48 pages).
Japanese Notice of Reasons for Refusal and its English translation for corresponding Japanese Application No. 2012-251965, dated Aug. 18, 2016 (10 pages).
Kataoka "Chapter 3 Mastering PlayStation Store" in "Smart guide for starting to learn PS Vita from scratch" Gijutsu-Hyohron Co., Ltd., first version, pp. 73-98 (Apr. 10, 2012).
Musoublog "Introduction of a way to purchase shin sangokumuso 6 DLC weapon 'Senka' etc.!" Shin-muso Blog, Internet Archive, Oct. 4, 2011, searched on Aug. 15, 2016 <URL:https://web.archive.org/web/20111004082520/http://musou.ldblog.jp/archives/1919565.html>.
Office Action dated Dec. 19, 2016, issued in U.S. Appl. No. 13/771,824 (48 pages).
Office Action dated Jun. 1, 2017, issued in corresponding U.S. Appl. No. 13/750,473, filed Jan. 25, 2013 of Mizuki et al., (55 pages).
U.S. Appl. No. 13/750,473, filed Jan. 25, 2013, Posted Information Sharing System, Information-Processing System, Information Processing Method, Storage Medium, and Computer Platform.
U.S. Appl. No. 13/800,278, filed Mar. 13, 2013, Information Processing System, Information Processing Device, Information Processing Method, and Storage Medium Having Stored Therein Computer Program.
U.S. Appl. No. 13/768,793, filed Feb. 15, 2013, Posted Information Sharing.
U.S. Appl. No. 14/715,083, filed May 18, 2015, Posted Information Sharing System, Information-Processing System, Information Processing Method, Storage Medium, and Computer Platform.
U.S. Appl. No. 14/852,181, filed Sep. 11, 2015, Posted Information Sharing System, Information-Processing System, Information Processing Method, Storage Medium, and Computer Platform.
U.S. Appl. No. 13/768,793, filed Feb. 15, 2013.
U.S. Appl. No. 14/715,083, filed May 18, 2015.
U.S. Appl. No. 14/852,181, filed Sep. 11, 2015.

(56) References Cited

OTHER PUBLICATIONS

Office Acton dated Oct. 5, 2017, issued in U.S. Appl. No. 14/715,083 to Mizuki, filed May 18, 2015 (20 pages).

* cited by examiner

| POST ID | TIME STAMP | APPLICATION ID | USER ID | TEXT | BINARY DATA | TAG |
|---|---|---|---|---|---|---|
| 351245 | 2012/3/19 21:09 | AAA001 | TARO YAMADA | I GOT A SECRET SWORD IN THE VILLAGE. | 010010000... | 53 HRS, VILLAGE |
| 351244 | 2012/3/19 18:15 | ABB007 | HANAKO SATO | I GOT A TIME SCORE 2:35:002 ON STAGE 5. | 010111110... | 12 HRS, STAGE 5 |
| 351243 | 2012/3/19 16:25 | AAA001 | HANAKO SATO | THE BOSS IN THE VALLEY OF MOUNTAIN IS TOO. | (NA) | 31 HRS, THE VALLEY OF MOUNTAIN |
| 351242 | 2012/3/19 14:55 | AAA001 | HANAKO SATO | I LEFT THE VILLAGE. | (NA) | 29 HRS, VILLAGE |
| 351241 | 2012/3/19 11:31 | AAA001 | ICHIRO SUZUKI | THIS GAME IS VERY DIVERTING. | (NA) | 35 HRS, CHURCH |
| ... | | | | ... | | ... |

| COMMUNITY ID | TITLE | APPLICATION ID | ATTRIBUTE INFORMATION | | |
|---|---|---|---|---|---|
| | | | USER WHO GENERATE THE SUBJECT COMMUNITY | NUMBER OF MEMBERS | URL |
| 000001 | THE LEGEND OF XYZ OFFICIAL COMMUNITY | AAA001 | OFFICIAL | 3568 | http://www.shopserver.com/xyz-shop.htm |
| 000002 | CLUB THE LEGEND OF XYZ | AAA001 | HANAKO SATO | 251 | http://www.shopserver.com/xyz-shop.htm |
| 000003 | TEAM XYZ | AAA001 | John Smith | 1075 | http://www.shopserver.com/xyz-shop.htm |
| 000004 | CART RACE OFFICIAL COMMUNITY | ABB007 | OFFICIAL | 9248 | http://www.shopserver.com/cartrace-shop.htm |
| 000005 | RACE MANIA | ABB007 | ICHIRO SUZUKI | 26 | http://www.shopserver.com/cartrace-shop.htm |
| ... | ... | ... | ... | ... | ... |

INFORMATION-PROCESSING SYSTEM, INFORMATION-PROCESSING DEVICE, STORAGE MEDIUM, AND INFORMATION-PROCESSING METHOD

CROSS REFERENCE TO RELATED APPLICATIONS

This application is based on and claims priorities under 35 USC 119 from Japanese patent application No. 2012-126002, which was filed on Jun. 1, 2012.

FIELD

The present disclosure relates to accessing a service for sharing posted information.

BACKGROUND AND SUMMARY

An information-processing system for using a communication function to share information among users of electronic devices is known.

The present disclosure provides collaboration between an application program and a service providing posted information.

There is provided an information-processing system including: an executing unit that executes an application program that is selected by a user from among a plurality of application programs; and a posted information sharing unit that receives and stores posted information and/or provides the posted information to users, wherein the posted information sharing unit includes: a posted information generating unit that generates the posted information; and a posted information storing unit that stores a plurality items of the posted information, each item of the posted information being stored along with identification information of an application program corresponding to the posted information, an information-processing system includes a requesting unit that identifies identification information of an application program being executed and requests the posted information sharing unit to output the posted information, the posted information sharing unit further includes a posted information outputting unit that extracts at least one item of the posted information corresponding to the identified identification information, from among the plurality of items of the posted information stored in the posted information storing unit, and outputs the extracted item of the posted information, and the executing unit further includes a posted information using unit that uses the posted information output from the posted information outputting unit.

BRIEF DESCRIPTION OF THE DRAWINGS

Exemplary embodiments will be described with reference to the following drawings, wherein:

FIG. 12 shows an example of data stored in posted information database 212;

FIG. 15 shows an example of the community list;

DETAILED DESCRIPTION OF NON-LIMITING EXEMPLARY EMBODIMENTS

1. Overview

Figure 1:
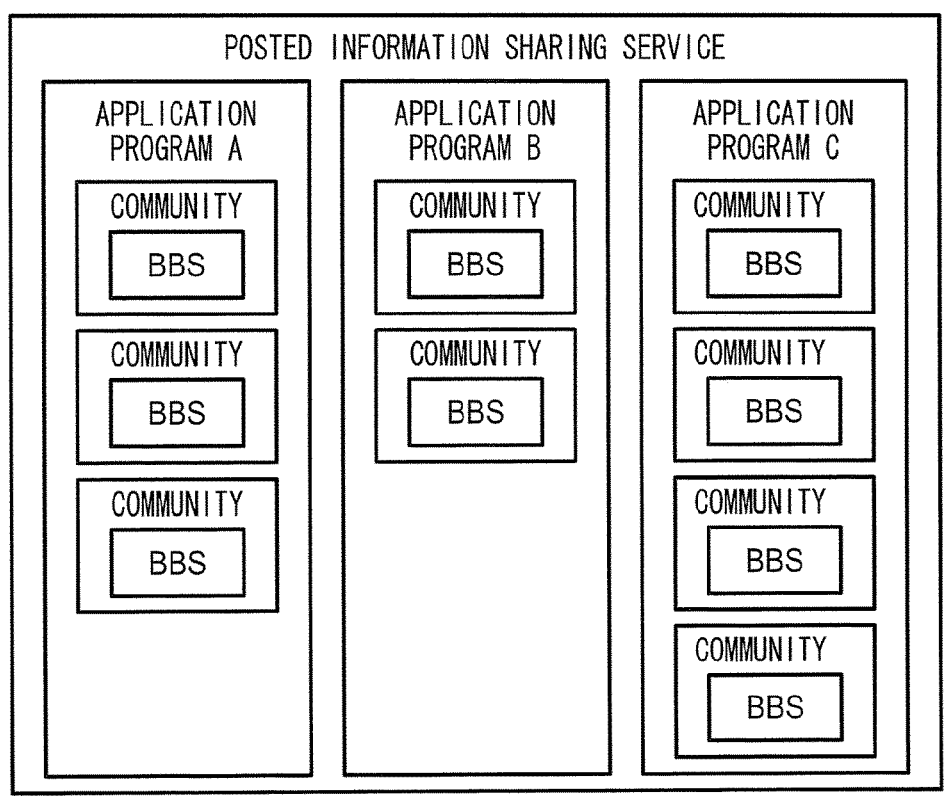
FIG. 1 shows an example of a posted information sharing service.

FIG. 1 shows an example of a posted information sharing service according to one exemplary embodiment. In the posted information sharing service, plural items of posted information are grouped in accordance with application programs to which they relate. At least a part of the items of posted information is provided in relation to a community. A community is, for example, a group of users. A user who belongs to a community is referred to as a member of the community.

According to this example, at least one community is provided for each application program. In other words, a provider or an operator of the posted information sharing system generates on a server at least one unique community for each application program. More specifically, when a new application program is released, the provider or the operator generates on a server at least one unique community for the new application program. Thus, at least one unique community and at least one unique bulletin board is provided by a server for every commercially available application program (in other words, every application program in use). In communities (n is a natural number that satisfies n>=1) correspond to an application program. In the example shown in FIG. 1, three communities exist for application program A, and two communities exist for application program B. Each community has a communication tool (for example, a bulletin board) for communicating with other members. A member communicates a message such as an opinion, an impression, a question, a comment, and so on, with other members. In other words, a user of the posted information sharing system can browse comments of other members, share his/her comments, or exchange messages with other members.

A user of the posted information sharing system can establish a relationship with another user as a "friend." The term "friends" refers to a relationship between two users who have agreed via the posted information sharing system to be friends with each other.

Figure 2:
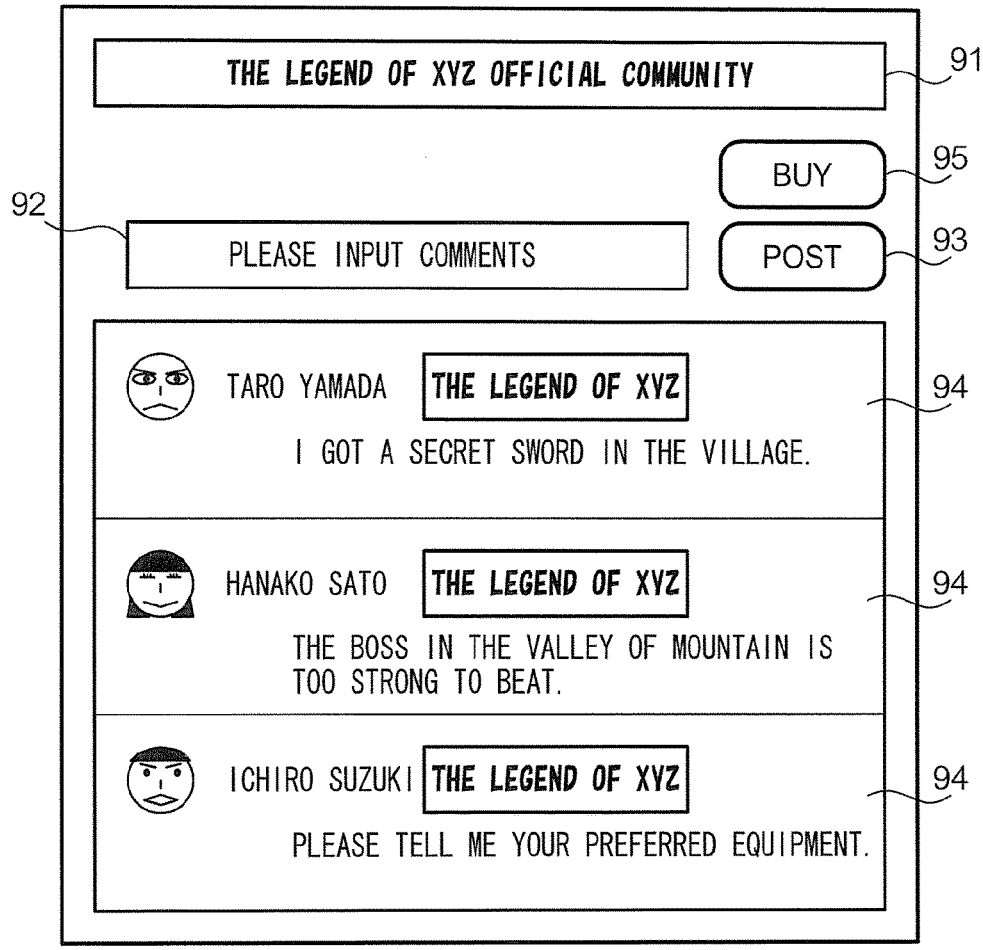
FIG. 2 shows an example of a screen image of the posted information sharing service.

FIG. 2 shows an example of a screen image of the posted information sharing service; more specifically, it shows a screen image of the communication tool in a community. The image includes title 91, text box 92, post button 93, plural items of posted information 94, and buy button 95. In other words, the image includes a user interface for the bulletin board system. Title 91 shows a title of the community. According to this example, the application program is a program for providing a video game (in other words, a game application), and title 91 includes information (at least one of text and image) for identifying the application program to which the community belongs. According to this example, title 91 shows that the community relates to a game of "the Legend of XYZ." Text box 92 is used to input a text to be posted. Post button 93 is used to input an instruction to transmit data such as the text input in text box 92, to the posted information sharing system (server). Posted information 94 shows information posted by a user. Details of posted information 94 will be described later. Buy button 95 is used to input an instruction to access a web site on which a corresponding application program is sold.

Figure 3:
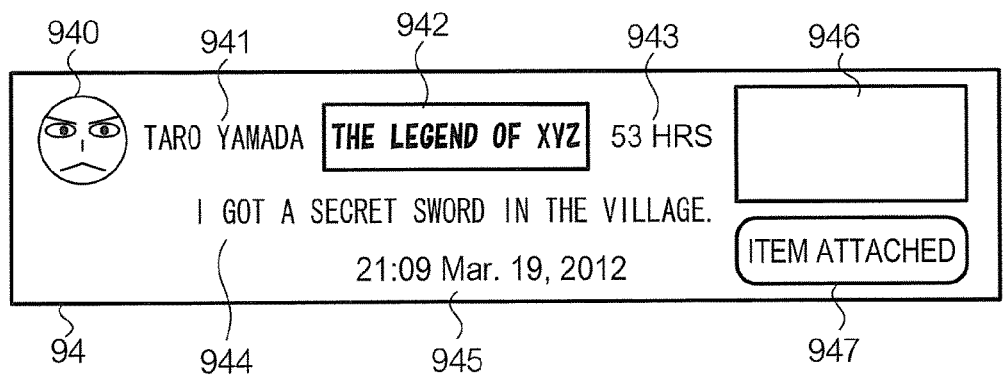
FIG. 3 shows exemplary details of posted information 94.

FIG. 3 shows exemplary details of posted information 94. Posted information 94 includes user image 940, user ID 941, application name 942, progress information 943, posted text 944, time stamp 945, screen shot image 946, and attached data image 947. User image 940 shows an image set up for a user who transmits this posted information 94. According to this example, the user image is a so-called avatar image. User ID 941 denotes a name of a user who posts this posted information 94. Application name 942 denotes information identifying an application program that is in executing state in the user's information-processing device at the time an instruction to transmit this posted information 94 is made.

Progress information 943 denotes a progress status of an application program in the progress status, for example, a stage number (stage name), a save point, or accumulated playing time of a game. Posted text 944 shows a text input by a user who posted this posted information 94. Time stamp 945 denotes a time when this posted information 94 was posted.

Screen shot image 946 is a screen shot image of an application program being executed. Attached data image 947 denotes whether data relating to this item of posted information 94 is attached. Attached data is generated by the application program being executed and shows, for example, data showing a virtual object such as an item in a game, generated by an application program executed in information-processing device 10 that transmits posted information 94.

In the example of posted information 94 shown in FIG. 3, it is shown that a user having a user ID "Taro Yamada" posted a text "I got a secret sword in the village." relating to a game "Legend of XYZ" at 21:09, Mar. 19, 2021.

It is to be noted that the posted information sharing service is merely an example of a service for providing the posted information. The posted information may be provided by, for example, a blog or a buzz marketing site. Further, as shown in FIG. 1, a single service has plural communities relating to plural application programs. However, plural services, each of which is unique to an application program, for sharing the posted information may be provided. For example, an information-processing service may be provided for application program A and a buzz marketing site may be provided for application program B.

It is to be noted that the posted information sharing service provides a user interface image independent of the application program as well as a user interface image corresponding to a community. A page referred to as "my page" is an example of the user interface image independent of the application program. In "my page," plural items of posted information posted by other users who are friends of the user or have association with the user, are shown in a single user interface image.

2. Configuration 2-1. Posted Information Sharing System 1

Figure 4:
FIG. 4 shows an example of a configuration of posted information sharing system 1.

FIG. 4 shows an example of a configuration of posted information sharing system 1 according to one exemplary embodiment. Posted information sharing system 1 includes plural information-processing devices 10, post server 20, and shop server 30. It is to be noted that only two information-processing devices 10 are shown in FIG. 4. Post server 20 is a server device providing a posted information sharing service. Plural communities in the posted information sharing service are provided by plural resources (for example, plural directories) in post server 20. In the posted information sharing service, each of plural users transmits posted information to post server 20 from his/her own information-processing device 10. When transmitting an item of posted information, information-processing device 10 adds identification information of an application program. More specifically, information-processing device 10 adds identification information of an application program being executed (which includes an application program that is suspended or paused as well as an application program that continues to be executed). Post server 20 stores plural items of posted information transmitted from plural information-processing devices 10. When storing posted information, post server 20 stores an item of the posted information along with information showing its relationship with an application program. If post server 20 receives a request for browsing the posted information from information-processing device 10, post server 20 reads at least one item of the posted information in response to the request, and provides the at least one item of the posted information to information-processing device 10 that is the source of the request. When transmitting a request, information-processing device 10 adds to the request identification information of the application program being executed. In response to the request, post server 20 extracts items of the posted information having identification information the same as that included in the request. The posted information includes information input by a user. The information includes, for example, at least one of a text, handwriting, and an image, as a message or a comment.

Figure 5:
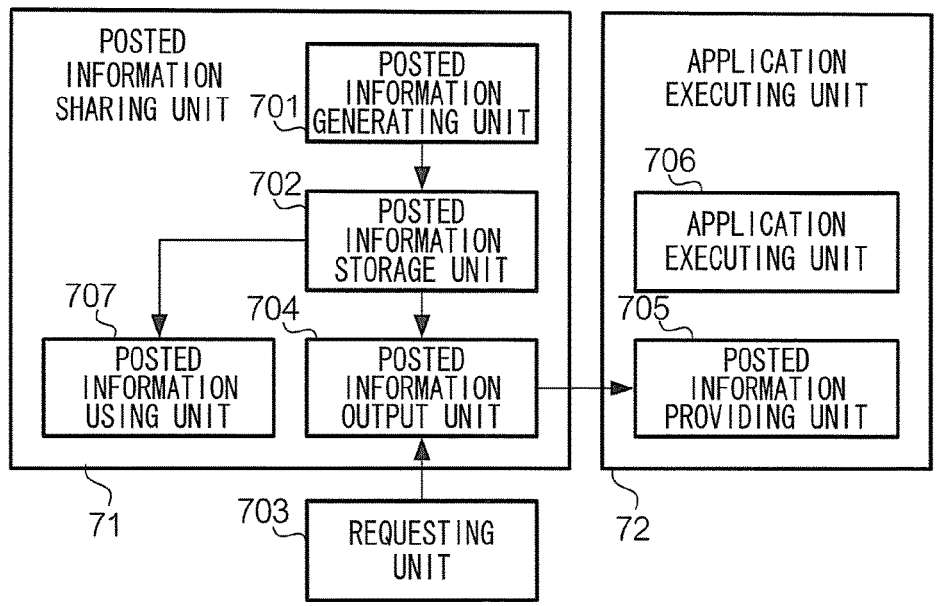
FIG. 5 shows an example of a functional configuration of information-processing system 1.

FIG. 5 shows an example of a functional configuration of information-processing system 1. Information-processing system 1 includes posted information sharing unit 71 and application executing unit 72. Posted information sharing unit 71 receives posted information, stores the received posted information, and provides the posted information. Application executing unit 72 executes an application program selected by a user from among plural application programs.

According to this example, posted information sharing unit 71 includes posted information generating unit 701, posted information storage unit 702, posted information output unit 704, and posted information providing unit 707. Posted information generating unit 701 generates an item of posted information. Posted information storage unit 702 stores the generated item of the posted information along with identification information of the corresponding application program.

Further, information-processing system 1 includes requesting unit 703. Requesting unit 703 requests posted information sharing unit 71 to output the posted information.

Posted information output unit 704 extracts at least one item of the posted information corresponding to the identification information included in the request from requesting unit 703, from among plural items of the posted information stored in posted information storage unit 702. Posted information output unit 704 outputs the extracted items of the posted information.

Application executing unit 72 includes posted information using unit 705 and application executing unit 706. Application executing unit 706 executes a process relating to an application program. Posted information using unit 705 obtains items of the posted information output by posted information output unit 704. Posted information using unit 705 executes a process using the obtained items of the posted information.

Posted information providing unit 707 obtains at least one item of the posted information stored in posted information storage unit 702, regardless of the identification information of the application program. Posted information providing unit 707 provides the obtained items of the posted information to users.

Information-processing device 10 can execute various application programs. Information-processing device 10 accesses a community corresponding to an application program being executed, from among the application programs, and displays results of the access. Here, the "application program being executed" is an application program that is being executed at the time when access to the posted information sharing service is instructed. "When access to the posted information sharing service is instructed" includes when access to the posted information sharing service is indirectly instructed, for example, when access to a menu image including an item for accessing the posted information sharing service is instructed, in addition to when access to the posted information sharing service is directly instructed.

2-2. Information-Processing Device 10

Figure 6:
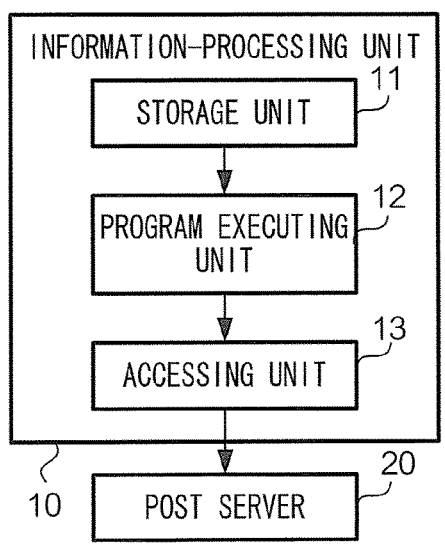
FIG. 6 shows an example of a functional configuration of information-processing device 10.

FIG. 6 shows an example of a functional configuration of information-processing device 10. Information-processing device 10 includes storage unit 11, program executing unit 12, and accessing unit 13. Storage unit 11 stores a first program and a second program. The first program is a program for accessing the posted information sharing service. The second program is a program different from the first program. Program executing unit 12 executes a program from one or more programs stored in storage unit 11 (program executing unit 12 may execute plural programs simultaneously. Accessing unit 13 accesses post server 20.

Figure 7:
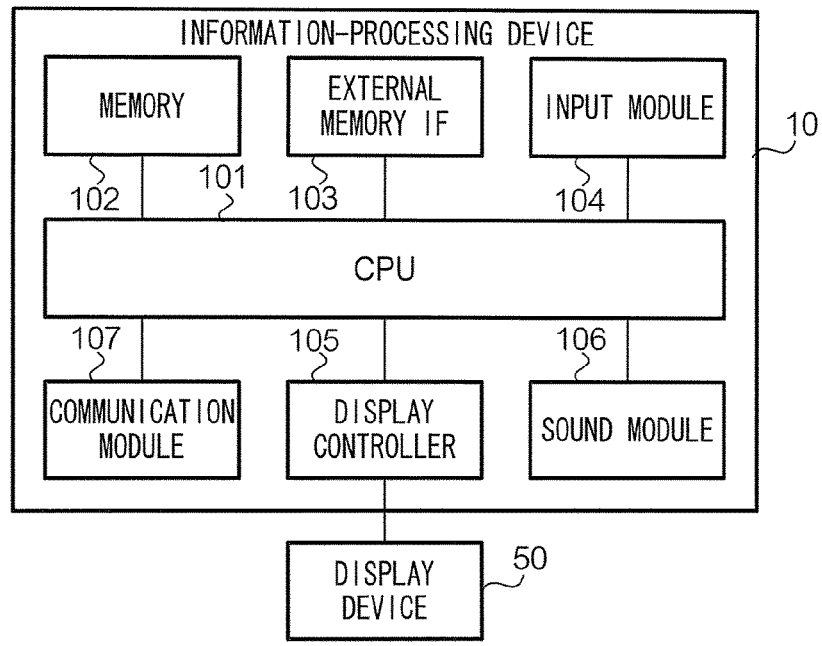
FIG. 7 shows an example of a hardware configuration of information-processing device 10.

FIG. 7 shows an example of a hardware configuration of information-processing device 10. According to this example, information-processing device 10 is a game device for playing a video game. Information-processing device 10 is a computer device including CPU (Central Processing Unit) 101, memory 102, external memory IF 103, input module 104, display controller 105, sound module 106, and communication module 107. Information-processing device 10 is connected to display device 50. Display device 50 is a device for displaying information such as an image and/or a character string, and includes a display (liquid crystal display panel or organic electro-luminescence display panel) and a driver circuit thereof. According to this example, information-processing device 10 is a so-called console type game device, which does not include display device 50. Display device 50 is an external device, such as a television. It is to be noted that information-processing device 10 may include display device 50.

CPU 101 is a device for controlling elements of information-processing device 10, and executes various processes or calculations. Memory 102 is a storage device for storing a program and data, such as RAM (Random Access Memory) and/or ROM (Read Only Memory), for example. External memory IF 103 is an interface for reading/writing data from/into an external storage medium (an optical disk, a magnetic disk, or a semiconductor memory, for example) that stores a program and/or data. Input module 104 includes an input device for inputting an instruction or command from a user to CPU 101, such as, for example, a keypad, buttons, a touch screen, a microphone, or a combination thereof. Display controller 105 is a device for controlling a display device to display information such as an image and/or a character string, such as an image processing circuit and an image signal output circuit. Sound module 106 includes a device for outputting a sound signal, such as a sound processing device and a sound signal output device. Communication module 107 includes a device for communicating with another device in a predetermined communication standard via a wired and/or a wireless network (for example, the Internet).

Figure 8:
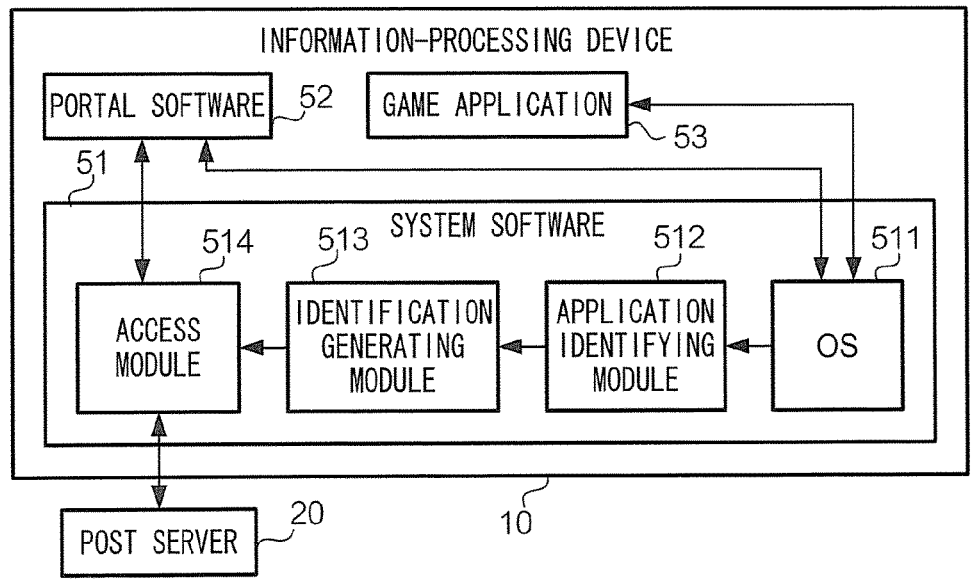
FIG. 8 shows an example of a software configuration of information-processing device 10.

FIG. 8 shows an example of a software configuration of information-processing device 10. Information-processing device 10 includes system software 51, portal software 52 (an example of a first program for accessing the posted information sharing service), and game application 53 (an example of a second program). According to this example, system software 51 and portal software 52 are preinstalled in memory 102 before information-processing device 10 is shipped. In other words, system software 51 and portal software 52 are provided as functions of a platform of information-processing device 10. Game application 53 is stored in an external storage device. It is to be noted that game application 53 may be stored in memory 102.

System software 51 is software for managing and/or controlling information-processing device 10. System software 51 is software necessary to execute an application program on information-processing device 10, and is required to be already installed in information-processing device 10 during execution of an application program. According to this example, system software 51 includes OS (Operating System) 511, application identifying module 512, identification generating module 513, and access module 514. System software 51 includes a set of codes to implement the functions of these modules. OS 511 is software to manage and/or control portal software 52 and a user application program such as game application 53. Application identifying module 512 identifies a user application program being executed. More specifically, application identifying module 512 obtains identification information (hereinafter referred to as an "application ID") of a user application program being executed. Identification generating module 513 generates identification information of a community relating to the application program identified by application identifying module 512. The identification information is, for example, a URL (Uniform Resource Locator, an example of service identification information) showing a resource of the community. Access module 514 communicates using a resource identified by the URL.

Portal software 52 is client software of the posted information sharing system, and provides a user interface for showing information to a user and receiving input of information by a user. Portal software 52 transmits a request to post server 20 via access module 514, and controls the display device to display an image relating to the posted information sharing system, using data transmitted from post server 20 in response to the request. The image relating to the posted information sharing system includes a UI (User Interface) for inputting, transmitting and displaying the posted information, and at least one item of posted information posted by at least one user.

Game application 53 is an application program (software) for implementing a video game on information-processing device 10. Information-processing device 10 has a function to execute at least one game application selected from various game programs. A program of game application 53 is stored, for example, in the external storage medium (an external memory). A user operates information-processing device to read a program stored in a storage medium that is selected by the user from among plural storage media storing different programs. Thus, the user causes information-processing device 10 to execute the selected game application. In another example, memory 102 stores plural programs. A user may select a program to be started, and cause information-processing device 10 to execute the selected game application.

Memory 102 and the external memory are examples of storage unit 11. CPU 101 is an example of program executing unit 12. CPU 101 executing access module 514 is an example of accessing unit 13.

2-3. Post Server 20

Figure 9:
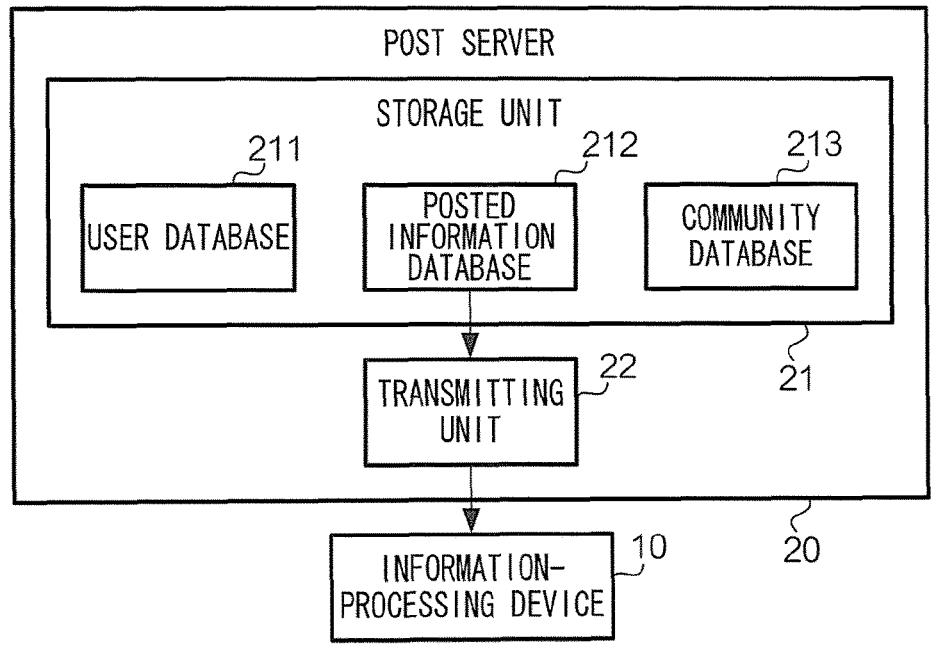
FIG. 9 shows an example of a functional configuration of post server 20.

FIG. 9 is an example of a functional configuration of post server 20. Post server 20 includes storage unit 21 and transmitting unit 22. Storage unit 21 stores user database 211, posted information database 212, and community database 213.

User database 211 is a database for recording user configuration information used for each of plural user IDs of the posted information sharing service. The user configuration information includes configuration information unique to a user; for example, a list of identifications of communities to which the user belongs, a condition for restricting the posted information shared in a community, or a list of user IDs showing users who are friends of the user. The condition includes, for example, a condition of restriction by time (for example, sharing posted information that was posted within the previous week), a condition of restriction by a user (for example, sharing only posted information that was posted by friends), or a condition of no restriction (sharing all the posted information posted within the previous week).

Posted information database 212 is a database for recording plural items of posted information. Each item of plural items of posted information corresponds to an application program from among the plural application programs. In other words, each item of plural items of posted information is stored with information showing its relationship with the application program. Further, according to this example, in posted information database 212, game data (binary data) is stored for at least a part of the items of the posted information, together with information showing their relationship.

Community database 213 is a database for recording information (attribute information) relating to each of the plural communities. Each of the plural communities corresponds to at least one application program. In other words, community database 213 is a database for recording, for each of the plural application programs, information relating to the at least one community corresponding to the application program. Transmitting unit 22 transmits posted information read from posted information database 212, in response to a request from information-processing device 10.

If portal software 52 accesses post server 20, transmitting unit 22 transmits all or a predetermined number of latest items of posted information and game data stored in storage unit 21 (a number of items may be extracted according to a different standard), regardless of the identification information of an application program. If game application 53 accesses post server 20, transmitting unit 22 transmits at least one extracted item each of posted information and game data stored in storage unit 21 to which identification information of an application program being executed corresponds. In a case of access from portal software 52, transmitting unit 22 transmits items of the posted information corresponding to plural application programs, for example.

According to this example, posted information database 212 includes, for at least a part of the posted information to which binary data is attached, added information showing current processes in each of the application programs by which the binary data is generated. If information-processing device 10 executing portal software 52 accesses post server 20, transmitting unit 22 transmits items of the posted information extracted regardless of an application program, along with corresponding added information. If information-processing device 10 executing game application 53 accesses post server 20, transmitting unit 22 transmits a list of items of the posted information and binary data corresponding to an application program, along with corresponding added information. Further, transmitting unit 22 transmits to information-processing device 10 an item of binary data from among plural items of binary data included in the list.

Post server 20 is a computer device including a CPU and a memory as hardware elements. The CPU is a control device that controls elements of post server 20. The memory is a storage device that stores various data and programs, and includes a RAM and a ROM. According to this example, the memory stores a server program causing a computer device to perform a process relating to functions of post server 20. By the CPU executing the server program, the functions shown in FIG. 9 are implemented.

2-4. Conclusion of Configuration

Cooperation of CPU 101 executing portal software 52 and post server 20 is an example of posted information sharing system 71. CPU 101 executing game application 53 is an example of application executing unit 72. CPU 101 executing portal software 52 is an example of posted information generating unit 701 and posted information providing unit 702. CPU 101 executing portal software 52 or game application 53 is an example of requesting unit 704. Post server 20 is an example of posted information output unit 704.

It is to be noted that correspondence between (i) posted information sharing unit 71 and application executing unit 72, and (ii) posted information storage unit 702, requesting unit 703, posted information output unit 704, posted information using unit 705, and posted information providing unit 707 is merely an example and possible configurations are not limited to this example. For example, application executing unit 72 may include posted information sharing unit 701 and posted information output unit 704.

3. Operation

Operations of information-processing device 10 will now be described. Two cases are assumed for accessing the posted information sharing service. The first case is accessing the posted information sharing service when game application 53 is being executed. The second case is accessing the posted information sharing service when game application 53 is not being executed. Operations of information processing device 10 in each of these two cases will be described.

3-1. Accessing the Posted Information Sharing Service when Game Application is being Executed Here, an example in which a community corresponding to game application 53 is accessed during execution of game application 53 in information-processing device 10 is described. In other words, an example in which a user playing game application 53 accesses a community corresponding to game application 53 being played currently, is described. In the following description, a method for accessing a posted information sharing service (post server 20) is described. Then, a process in posted information sharing system 1 (in other words, what actions can be performed using posted information sharing system 1) is described.

3-1. Methods for Accessing Posted Information Sharing Service

Figure 10:
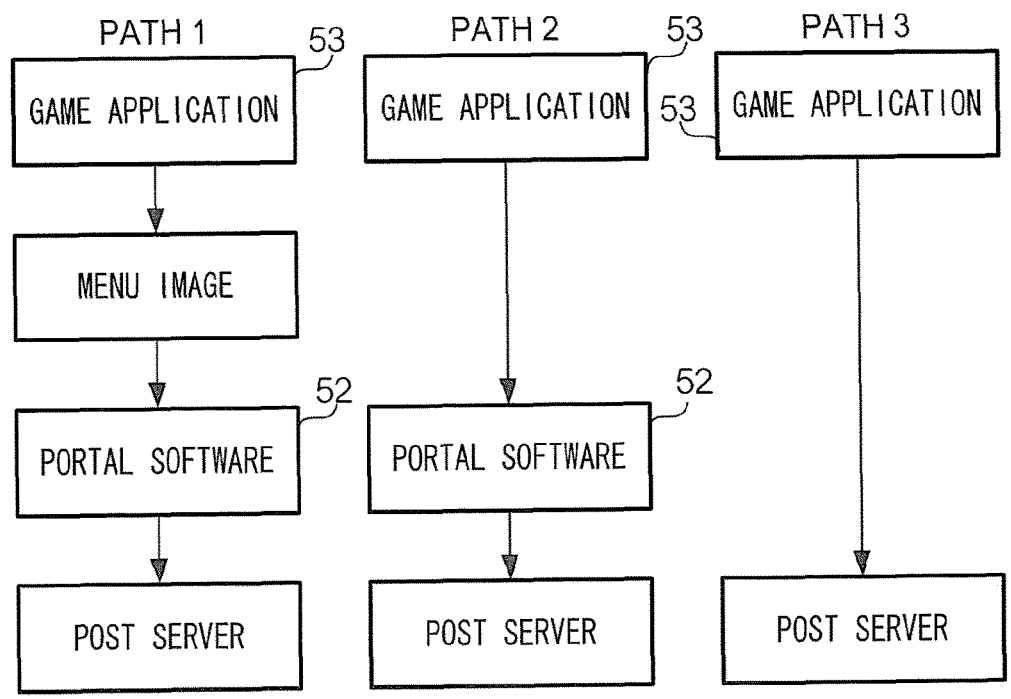
FIG. 10 shows examples of methods for accessing the posted information sharing service.

FIG. 10 shows examples of methods for accessing the posted information sharing service. The methods for accessing the posted information sharing service are divided into two categories. In the first category access is made to post server 20 via portal software 52, as shown as paths 1 and 2 in FIG. 10. In the second category access is made to post server 20 directly from game application 53, as shown as path 3 in FIG. 10. The first category includes two methods. According to the first method, (i) the execution of game application 53 is temporarily paused, (ii) a function (for example, a menu image) of system software 51 is called, and (iii) portal software 52 is selected via the menu image. The first method is also referred to as path 1. According to the second method, portal software 52 is accessed directly from game application 53. The second method is also referred to as path 2. Details of these methods will be described below.

3-1-1-1. Access Via Portal Software 52

3-1-1-1-1. (Path 1) Call Via Menu Image

According to this example, OS 511 temporarily pauses the execution of game application 53 when a predetermined command is input (for example, when a predetermined button from among plural buttons of input module 104 is pushed) when game application 53 is being executed. Then, OS 511 calls a menu image. The menu image is provided by a function of system software 51. The menu image includes an item for instructing portal software 52 to start. If a user selects the item, OS 511 starts portal software 52. The user accesses the posted information sharing service via portal software 52. According to this example, after the menu image is called and during the access to the posted information sharing service, game application 53 that was being executed is temporarily paused. If a predetermined command is input while game application 53 is paused, OS 511 resumes game application 53.

Figure 11:
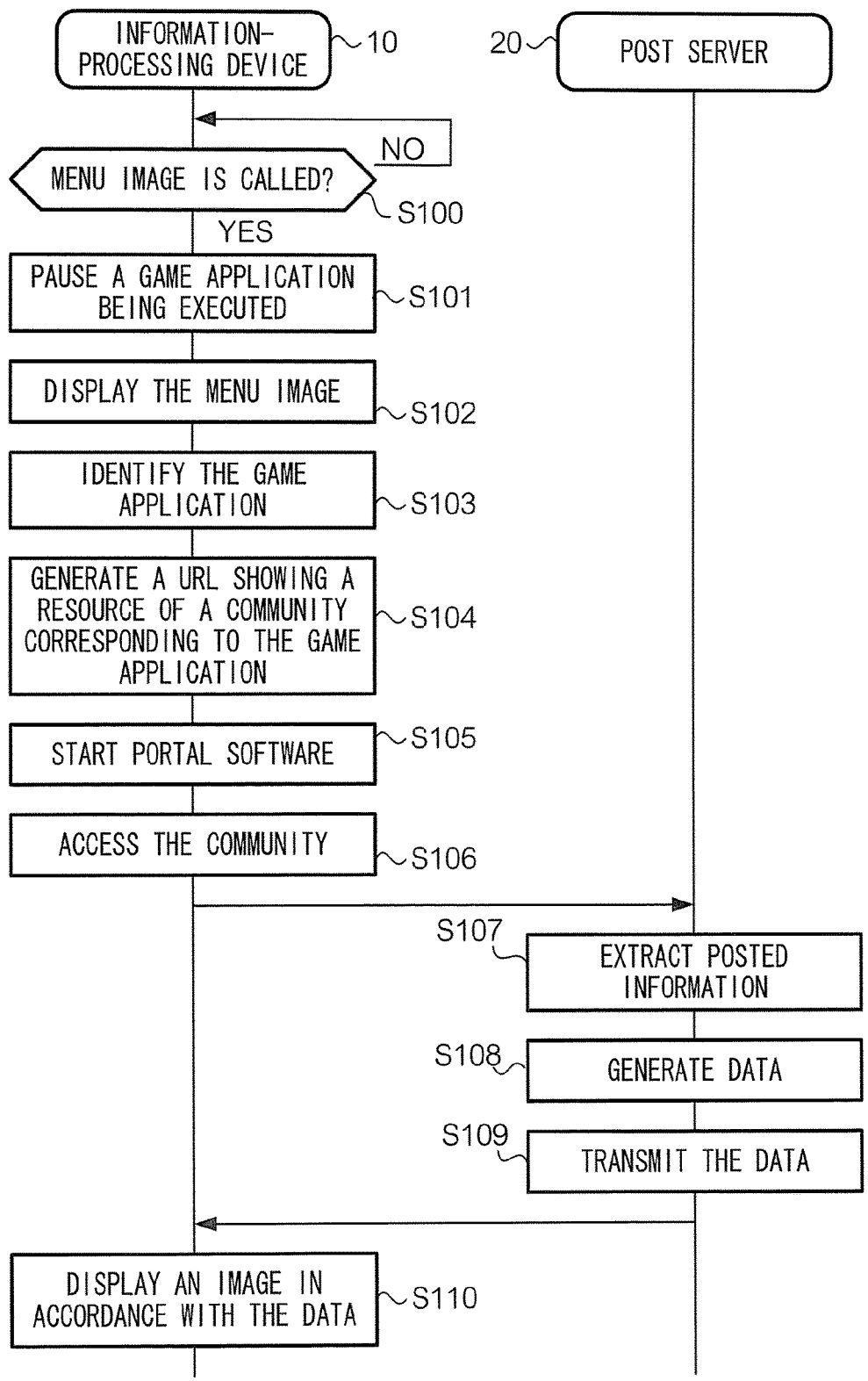
FIG. 11 shows an example of a sequence chart illustrating an operation of information-processing device 10.

FIG. 11 shows an example of a sequence chart illustrating an operation of information-processing device 10. In the following descriptions, a program such as OS 511 or portal software 52 is described as a subject of the process. These descriptions mean that CPU 101 executing the program co-operates with other hardware devices to execute the process.

In step S100, OS 511 determines whether the menu image is called during the execution of game application 53. According to this example, OS 511 monitors input module 104. If a predetermined command is input via input module 104, OS 511 determines whether the menu image is called. If it is determined that the menu image is called (step S100: YES), OS 511 transfers the operation to step S101. If it is determined that the menu image is not called (step S100: NO), OS 511 continues to execute game application 53.

In step S101, OS 511 pauses game application 53 that is being executed. In other words, OS 511 activates another program, with data used for game application 53 being stored in memory 102.

In step S102, OS 511 displays the menu image. The menu image includes an item for instructing portal software 52 to start. If the user selects the item, OS 511 transfers the operation to step S103.

In step S103, application identifying module 512 identifies an application program (an application program being executed, in this example, game application 53) that was being executed at the time of input of the instruction to call the menu image. Details are as follows. OS 511 reads from memory 102 the application ID of the application program being executed. Then, OS 511 calls application identifying module 512. When calling application identifying module 512, OS 511 notifies application identifying module 512 of the read application ID. It is to be noted that the application ID of the application program being executed is stored in memory 102, according to a process independent from the flow shown in FIG. 10. More specifically, when starting an application program, OS 511 obtains the application ID from the application program. OS 511 continues to store the application ID in memory 102 from the start to the termination of the application program.

In step S104, identification generating module 513 generates a URL (an example of community identification information) showing a resource of the corresponding community, using the application program identified by application identifying module 512. Identification generating module 513 includes a table, a function, or a rule for exchanging an application ID for a URL. Identification generating module 513 generates the URL from the application ID with reference to the table, the function, or the rule.

In step S105, OS 511 starts portal software 52. When starting portal software 52, OS 511 notifies portal software 52 of the URL generated by identification generating module 513 as a URL showing a resource that is accessed when the portal software 52 is started.

In step S106, portal software 52 accesses the community shown by the notified URL. In other words, portal software 52 accesses, via access module 514, a resource (in this example, a directory selected from among plural directories of post server 20, in response to the application being executed) corresponding to an application program that was being executed at the time when portal software 52 is instructed to start.

When accessing post server 20, access module 514 transmits to post server 20 a request including the application ID and a user ID of the user of information-processing device 10. The user ID is an example of identification information of a user who is logged in to information-processing device 10 (in other words, a user who uses information-processing device 10). The user ID is identified at a predetermined timing, for example, at the time of booting information-processing device 10, by a so-called login process.

FIG. 12 shows an example of data stored in posted information database 212. Posted information database 212 includes plural data sets. Each data set includes a post ID, a time stamp, an application ID, a user ID, a text (posted text), a set of binary data, and a tag (an example of added information). The post ID is identification information for identifying the posted information. The post ID is allocated by post server 20 according to a predetermined rule (for example, the post ID is allocated in order of receipt of the posted information). The time stamp shows the time when the posted information is received (or when the posted information is posted). The application ID is identification information for identifying an application program corresponding to the posted information, more specifically, an application program (the application program being executed) that was being executed in information-processing device 10 when an instruction to post the subject posted information was made. The user ID is identification information of a user who posts the subject posted information. The posted text consists of character strings input by the user. It is to be noted that handwritten characters (or image) or a text automatically generated by the system may be used instead of or as well as the posted text. The set of binary data is a data set used in the application program identified by the corresponding application ID. More specifically, the set of binary data is a data set generated by the subject application program. The tag is data showing other related information. According to this example, the tag includes usage information showing the usage status. The usage information shows information that cumulatively changes depending on the usage of the application program, for example, accumulated playing time of a game, or information that discontinuously changes depending on the usage of the application program; for example, a name of a save point in a game. It is to be noted that FIG. 12 merely shows an example, and information included in the posted information is not restricted to the example. A part of information shown in FIG. 12 may be omitted, and/or other information may be added to the example.

It is to be noted that progress information or information showing the usage status of the application program may be used instead of (or as well as) the usage information. The progress information shows the progress status of the application program. The usage information, the progress information, and the information showing the usage status are not restricted to the examples described above, the accumulated playing time and the name of the latest save point. In a case that the application program is a game application, the usage information, the progress information, and the information showing the usage status may be, for example, at least one of a number of times that the user clears the game, a number of times that the user plays the game, a number of times that the user defeats a character in the game, a type of a character in the game, a type of an event that occurs in the game, a number of wins (or losses) in the game, a number of items obtained in the game, the number of the latest stage cleared by the user, a name of the latest save point, a level of a character in the game, or an achievement (a degree of completion of tasks provided in the game).

In another example, in a case that the application program is a movie player, the status information may be a number of times that a movie is played, accumulated time of playing a movie, or a number of times an instruction to play a movie is made. In yet another example, in a case that the application program is a still image viewer, the usage information, the progress information, and the information showing the usage status may be a number of viewed pages, a type of viewed image, or a number of times an instruction to view an image is made.

Referring to FIG. 11 again, when post server 20 receives a request from information-processing device 10, post server 20 extracts (in step S107) at least a part of the posted information from the posted information recorded in posted information database 212, with reference to the user con-figuration information. More specifically, in a case that the application ID included in the request for access is "AAA001," post information having the post ID "351245," "351243," "351242," and "351241" is extracted in the example of FIG. 11. Further, at least a part of posted information that satisfies the condition for restricting the posted information is extracted from the extracted posted information. For example, in a case that the condition for restricting the posted information is "the newest posted information of each user" and "maximum total sum of the posted information is three," the posted information having the post ID "351245," "351243," and "351241" is extracted.

Post server 20 lists the extracted posted information (a group of the posted information) in an order according to a predetermined rule; for example, in an order of time stamps. Post server 20 generates (in step S108) data describing the extracted posted information in a predetermined format, for example, in HTML (HyperText Markup Language). Here, the generated data includes a community ID, identifying a community to which access is requested. The community ID is, for example, a part of the URL of the community. Post server 20 transmits (in step S109) the generated data to information-processing device 10 that is a source of the request for access.

In step S110, portal software 52 displays an image in accordance with the data received from post server 20. By the example of step S107, an image shown in FIGS. 2 and 3 is displayed. It is to be noted that the image to show the posted information is not restricted to the example shown in FIG. 3. In the example shown in FIG. 3, the usage information of "53 h" is displayed as it is. In another example, portal software 52 may change the image of at least one item included in the posted information in response to the usage information. More specifically, a shape, a color, or a size of the at least one item may be changed in response to the usage information. As a more detailed example, portal software 52 displays user ID 942 using a different color in a case that the posted information has the usage information (or the posted information is posted by a user who has played the game) from that used in a case that the posted information does not have the usage information (or the posted information is posted by a user who has not played the game). Alternatively, portal software 52 may display an image (an icon or a mark, for example) showing existence/non-existence of the usage information.

According to the flow shown in FIG. 11, a process for accessing the posted information sharing service (a community) and a process for providing a user interface (UI) are executed by the system software 51 or portal software 52. In other words, if the user application program does not have a function to access the posted information sharing service, a user can easily access a community relating to the user application program. For example, a user playing a game can share with other users his/her positive or negative experiences, for example, obtaining a rare item, clearing a stage, or encountering a dead end in the game. In addition, for a developer of an application program, cost for implementing functions to access post server 20 and to provide the UI can be decreased.

In the above description, an example in which portal software 52 is started from the user application program via the menu image is described. However, portal software 52 may be started other than via the menu image. In such a case, OS 511 starts portal software 52 when a predetermined command is input during the execution of game application 53. In another example, when game application 53 is being executed when the menu image is called, game application 53 may be terminated instead of be paused. In another example, a device ID (identification information of information-processing device 10) may be used instead of the user ID.

3-1-1-1-2. (Path 2) call from game application 53

According to this example, an application program has a UI to start portal software 52. For example, an image of the game includes a button to start portal software 52. If the button is pushed (clicked) by a user, portal software 52 is started. The details of the process are similar to those of path 1.

According to the example, a user can start portal software 52 without inputting a command via the menu image provided by a program other than the game. The user can start portal software 52 by inputting a command via a UI provided by the game.

3-1-1-2. (Path 3) Access from Game Application 53

According to this example, an application program has a UI to access the posted information sharing service; in other words, the application program has a client function of the posted information sharing system 1. For example, an image of the game includes a button to access the posted information sharing service. If the button is pushed (clicked) by a user, the game application accesses the posted information sharing service. In path 3, the application program has a function different from examples of path 1 and path 2. Therefore, a software configuration will be first described.

Figure 13:
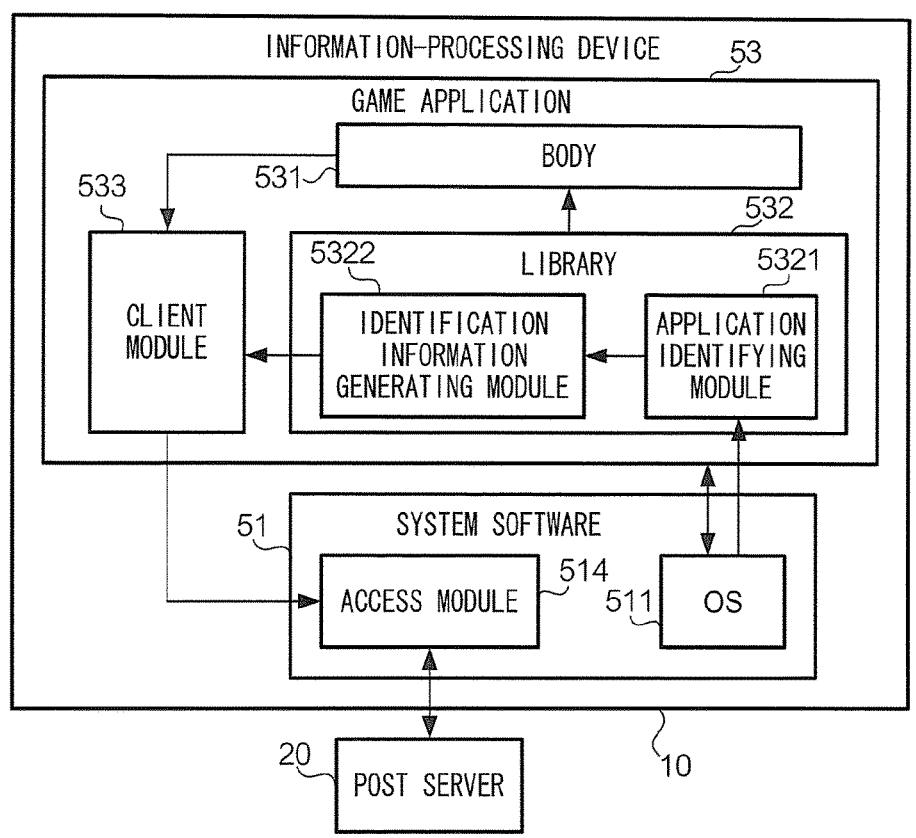
FIG. 13 shows an example of a software configuration relating to path 3.

FIG. 13 shows an example of a software configuration relating to path 3. According to this example, game application 53 includes body 531 of the game program, library 532, and client module 533. Client module 533 is a client software module of the posted information sharing system 1, for accessing the posted information sharing service (post server 20) via access module 514. Library 532 is a software module used in body 531, and includes, for example, application identifying module 5321 and identification information generating module 5322. Application identifying module 5321 identifies an application program that is being executed. More specifically, application identifying module 5321 obtains an application ID of the application program being executed. Identification information generating module 5322 generates identification information (a URL, for example) of a community relating to the application program being executed. Library 532 is provided by the provider of the platform of information-processing device 10 (the provider of the game device, for example) for software developers. It is to be noted that application identifying module 512 and identification generating module 513 are not shown in FIG. 13 because these functions are not used in this example.

In the example shown in FIG. 13, application identifying module 5321 is an example of application identifying unit 14, and identification information generating module 5322 is an example of generating unit 18.

If an instruction to access the posted information sharing service is made during the execution of game application 53, body 531 of the game program calls application identifying module 5321. When calling application identifying module 5321, body 531 notifies application identifying module 5321 of the application ID of the game program. Then, application identifying module 5321 calls identification information generating module 5322. Identification information generating module 5322 generates a URL showing a resource of the corresponding community based on the application ID identified by application identifying module 5321. Identification information generating module 5322 includes a table, a function, or a rule to change an application ID into a URL. Identification information generating module 5322 generates a URL from the application ID with reference to the table, the function, or the rule.

Identification information generating module 5322 notifies body 531, which is a source of the call, of the generated URL. Then, body 531 of the game program calls client module 533. When calling client module 533, body 531 of the game program notifies client module 533 of the URL of the community. Client module 533 accesses post server 20 by using the notified URL.

According to the example, a user can access the posted information sharing service without inputting a command via the menu image provided by a program other than the game. Further, since a software developer can incorporate a client function into the application program, a UI synchronized with the image of the game can be provided.

3-1-2. Process in Posted Information Sharing System

Next, description will be given of a process in the posted information sharing system 1 (how a user can use the posted information sharing system 1). The process in the posted information sharing service includes browsing the posted information, posting the posted information, and downloading data.

3-1-2-1. Browsing

Browsing is a process for browsing the posted information. Information stored in post server 20 includes, for example, the posted information and direct messages. The posted information is shared by plural users. The direct message can be viewed by a single specified user. In the following descriptions, viewing this information using portal software 52 will be described.

3-1-2-1-1. Browsing posted information relating to community

Figure 14:
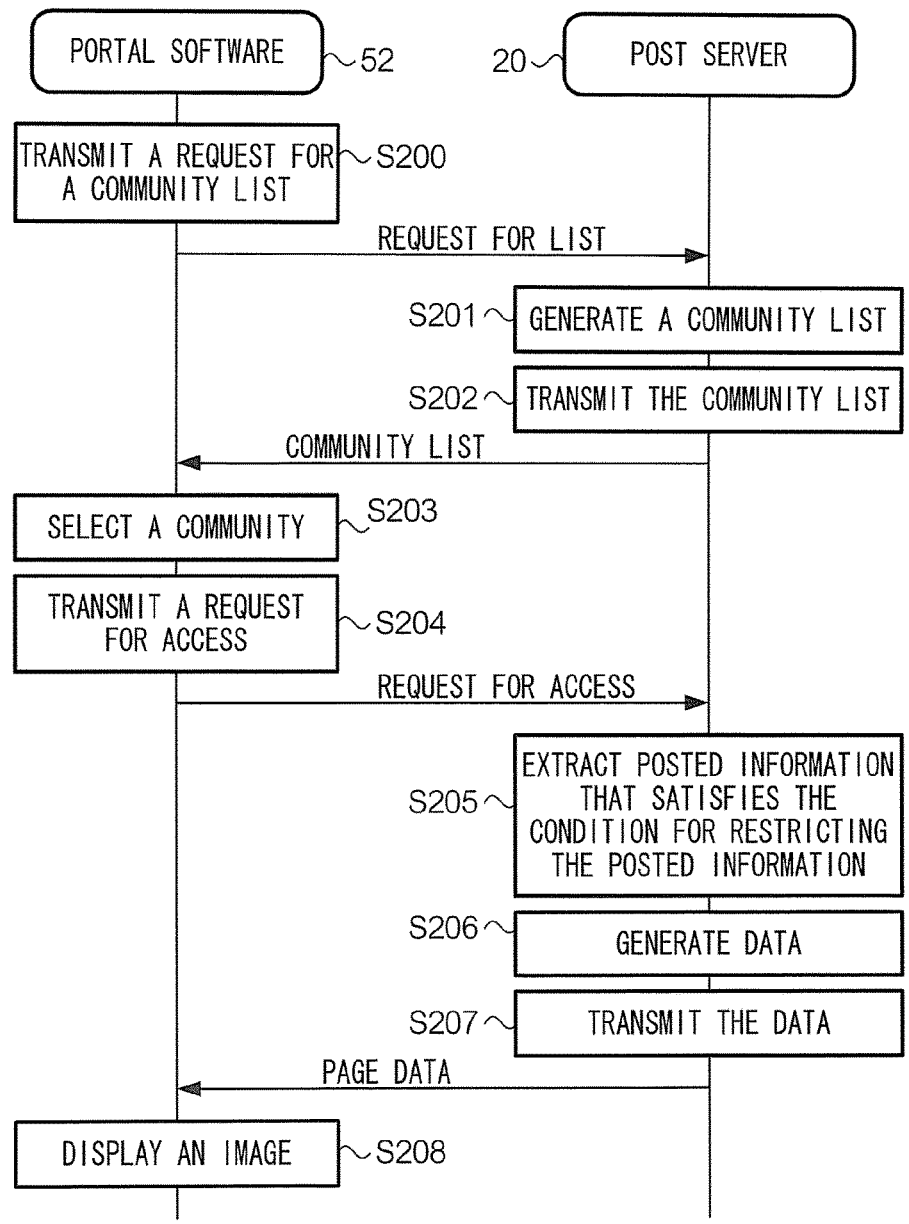
FIG. 14 shows an example of a sequence chart illustrating a process for browsing the posted information relating to a community.

FIG. 14 shows an example of a sequence chart illustrating a process for browsing the posted information relating to a community. In step S200, portal software 52 transmits to post server 20 via access module 514 a request for transmitting a list of communities. The request includes the user ID of a user of information-processing device 10. When post server 20 receives the request from information-processing device 10, post server 20 extracts from community database 213 information showing communities to which the user having the user ID included in the request belongs. Post server 20 generates (in step S201) a list of the extracted communities (hereinafter referred to as a "community list").

FIG. 15 shows an example of the community list. The community list includes a community ID, a title, an application ID, and attribute information. The community ID is identification information for identifying a community (hereinafter, a specific community that is an object of the description will be referred to as a "subject community"). The community ID is automatically allocated by the system (more specifically, by post server 20). The title is identification information for identifying the subject community, and is input by a user who generates the subject community. The application ID is identification information for identifying an application program corresponding to the subject community. The attribute information shows an attribute of the subject community. According to this example, the attribute information includes, for example, the user who generates the subject community, a number of members who belong to the subject community, and a URL of the subject community. The user who generates the subject community is identified by the user ID. According to this example, the community is divided into two categories, an official category and a user category. The official community is a community that is generated by a provider of posted information sharing system 1 or a provider of the application program. For the official community, the user is recorded as "official." The user community is a community that is generated by a user. The number of members shows a number of users who belong to the subject community. The URL shows a resource providing the subject community. It is to be noted that the attribute information may include other information, for example, a required condition to join the subject community.

Referring to FIG. 14 again, post server 20 transmits (in step S202) the generated community list to information-processing device 10 that is the source of the request. When portal software 52 receives the community list, portal software 52 displays an image for prompting a user to select a community. The user selects (in step S203) a community to be browsed via the image. After a community is selected, portal software 52 transmits (in step S204) a request for accessing post server 20 via access module 514. The request includes the user ID of the user of information-processing device 10, and the community ID of the selected community.

When post server 20 receives the request from information-processing device 10, post server 20 extracts (in step S205) posted information that satisfies the condition for restricting the posted information, from the posted information recorded in posted information database 212. Post server 20 generates (in step S206) data describing the extracted posted information in a predetermined format. Post server 20 transmits (in step S207) the generated data to information-processing device 10 that is the source of the request. Portal software 52 receives the data via access module 514. Portal software 52 displays (in step S208) an image in accordance with the data received from post server 20. Details of steps S205 to S208 are similar to those in steps S107 to S110.

3-1-2-1-2. Viewing Direct Message

Figure 16:
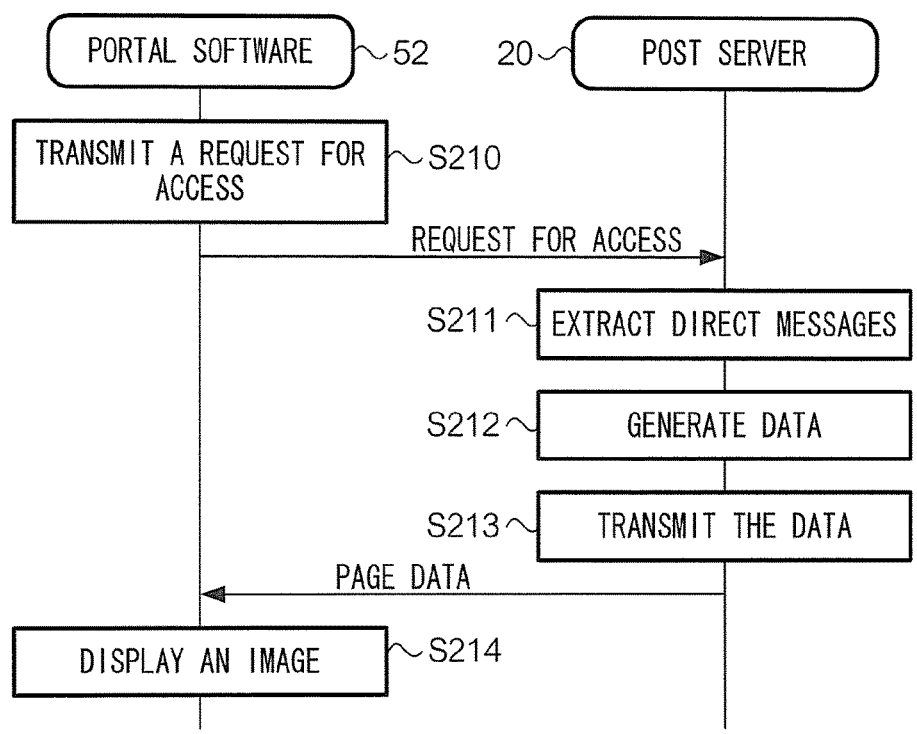
FIG. 16 shows an example of a sequence chart illustrating a process for viewing a direct message.

FIG. 16 shows an example of a sequence chart illustrating a process for viewing a direct message. In step S210, portal software 52 transmits to post server 20 via access module 514 a request for accessing a direct message. The request includes a user ID.

When post server 20 receives the request from information-processing device 10, post server 20 extracts (in step S211) direct messages that satisfy the condition for restricting the posted information, from among the direct messages recorded in posted information database 212. It is to be noted that the condition for restricting the posted information includes a condition relating to the direct message. Post server 20 generates (in step S212) data describing the extracted direct message in a predetermined format. Post server 20 transmits (in step S213) the generated data to information-processing device 10 that is the source of the request. Portal software 52 displays (in step S214) an image in accordance with the data received from post server 20. Details of steps S211 to S214 are similar to those in steps S107 to S110.

3-1-2-2. Posting

The posting is a process for sharing information with other users. As described in relation to the browsing, information recorded in post server 20 includes the posted information and the direct message. According to this example, a set of binary data can be attached to the posted information. Here, description will be given for examples with and without the set of binary data. Furthermore, description will be given for posting a direct message.

3-1-2-2-1. Posting Text

Figure 17:
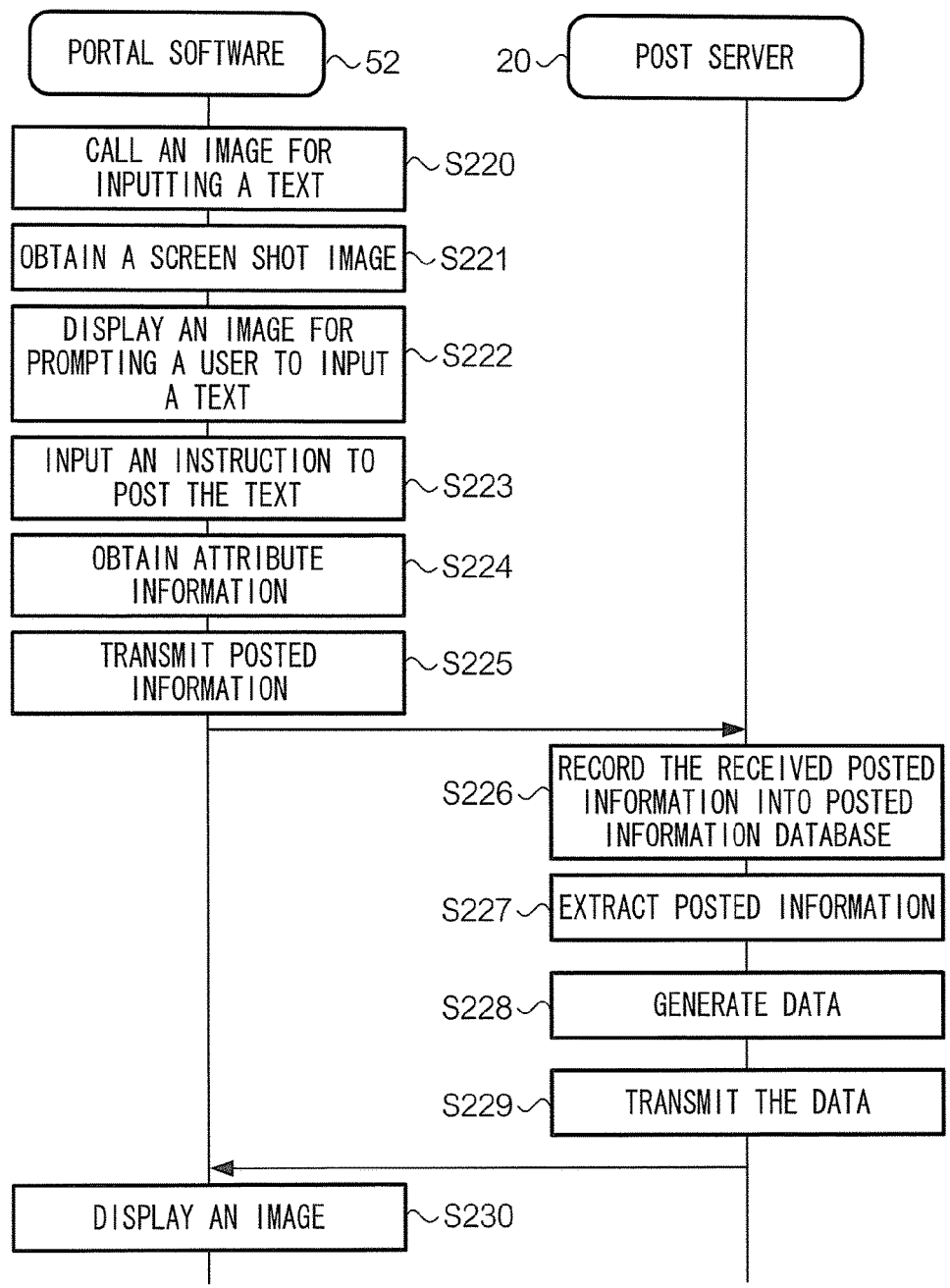
FIG. 17 shows an example of a sequence chart illustrating a process for posting a text.

FIG. 17 shows an example of a sequence chart illustrating a process for posting a text. Here, description will be given for an example in which portal software 52 is called during the execution of game application 53, and a text is posted via portal software 52. In step S220, portal software 52 calls an image for inputting a text. The call is triggered by a predetermined event, for example, an instruction to start portal software 52 is input.

In step S221, portal software 52 obtains a screen shot image of the application program being executed. The application program "being executed" is an application program that was being executed at the time when the instruction to start portal software 52 was made, and, according to this example, game application 53 is the application program being executed. While portal software 52 is activated, game application 53 is temporarily paused. As has already been described, while game application 53 is paused, data used for game application 53 is expanded in memory 102. Portal software 52 generates a screen shot image based on the data of game application 53 expanded in memory 102.

In step S222, portal software 52 displays an image for prompting a user to input a text to post. The image is shown in FIG. 2, for example. The user inputs a text to be posted, via the image. After completing the input of the text to be posted, the user inputs (in step S223) an instruction to post the text, by clicking post button 93, for example.

In step S224, portal software 52 obtains attribute information used for the posted information. According to this example, the attribute information includes a time stamp, a user ID, an application ID, a community ID, and usage information. The time stamp shows the current time. The application ID is identification information of the application program that is paused. The usage information is the usage information of the application program that is paused. According to this example, the usage information shows accumulated playing time of the game. The time stamp, the user ID, the application ID, and the usage information are held by OS 511. Portal software 52 obtains from OS 511 the time stamp, the user ID, the application ID, and the usage information. The community ID is identification information of a community that portal software 52 is accessing. The community ID is held by portal software 52.

For example, in a case that an accumulated playing-time of the game is used as the usage information, OS 511 keeps the accumulated playing-time by a process independent from the process shown in FIG. 16 Memory 102 stores the usage information of application programs that have been played in the subject information-processing device 10 as well as a corresponding application ID with the relationship thereof. For example, in a case that ten game applications have been played in the subject information-processing device 10, ten sets of application ID and accumulated playing-time are stored in memory 102. When an application program is started, OS 511 measures by a timer (not shown in the figures) a time during which the application program is executed. At a predetermined timing (for example, periodically, or when the application program is terminated), OS 511 adds the measured time to an accumulated playing-time of the subject application program, from among the plural accumulated playing-times stored in memory 102. It is to be noted that the accumulated playing time may be recorded for each user.

Referring to FIG. 17 again, in step S225, portal software 52 transmits the posted information to post server 20 via access module 514. The subject posted information includes the attribute information obtained in step S224.

According to the example, the posted information includes usage information or progress information corresponding to an application program. In other words, an image including a text input by a user, identification information of an application program, and usage information or progress information of the application program. The posted text is freely input by a user while the identification information and the usage information (or the progress information) of the application program is automatically added by the system. In the information-processing system 1, if a text relating to an application program is posted by a user, information showing an amount of use of the application program by the user is provided for other users. In other words, to users of information-processing device 10, objective information used for determining benefit or reliability is provided. For example, if there are two texts for a game: the first text "This game is boring." posted by a user who has played a game for one hour; and the second text "This game is very diverting!" posted by another user who has played the game for fifty hours, users of information-processing device 10 can judge that the second text has higher reliability.

In step S226, post server 20 records the received posted information into posted information database 212. Post server 20 extracts (in step S227) posted information that satisfies the condition for restricting the posted information from posted information database 212. Post server 20 generates (in step S228) data showing the extracted posted information in a predetermined format. Post server 20 transmits (in step S229) the generated data to information-processing device 10 that is the source of the request. Portal software 52 displays (in step S230) an image in accordance with the data received from post server 20. Details of steps S227 to S230 are similar to those of steps S107 to S110.

3-1-2-2-2. Posting Binary Data

Figure 18:
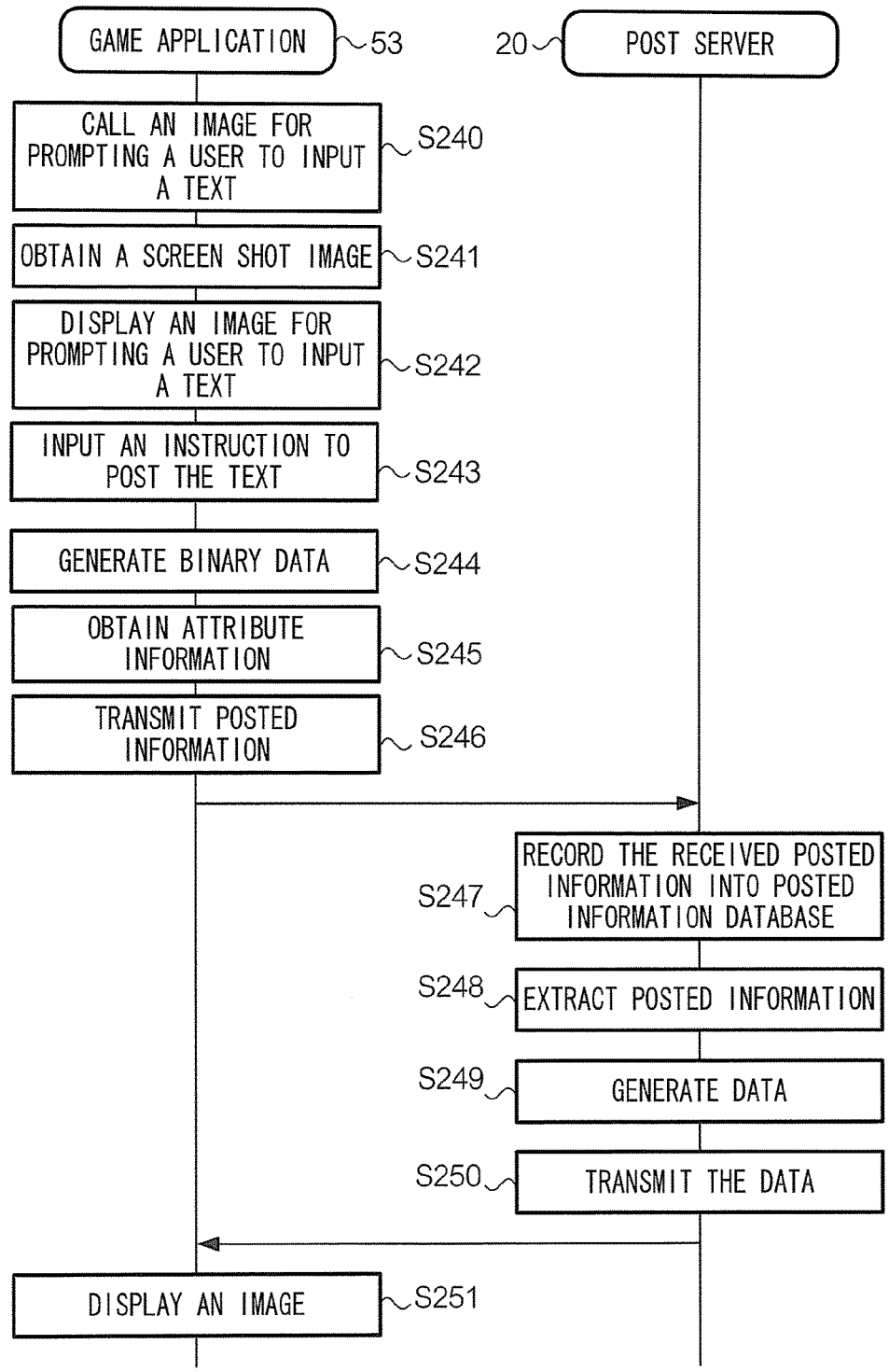
FIG. 18 shows an example of a sequence chart illustrating a process for posting information including a set of binary data.

FIG. 18 shows an example of a sequence chart illustrating a process for posting information including a set of binary data. Here, description will be given for an example in which game application 53 transmits a posted text and a corresponding set of binary data. In step S240, game application 53 calls an image for prompting a user to input a text. The call of the image is triggered by a predetermined event, for example, a predetermined command is input during the execution of the game.

In step S241, game application 53 obtains a screen shot image of the application program being executed. In step S242, game application 53 displays the image for prompting a user to input a text. After completing an input of a text, the user instructs (in step S243) to post the text. Details of steps S241 to S243 are similar to those in steps S221 to S223.

According to this example, the image for prompting a user to input a text provides a UI to select a set of binary data to be attached to the posted text. For example, in a case that binary data shows an item used in the game, the image provides a UI to select an item from among items obtained in the game by the user, to be shared in the community. In step S244, game application 53 generates a set of binary data showing an item selected via the UI. It is to be noted that game application 53 may generate or select the binary data automatically. Alternatively, data generated by the application program being executed may be used as the binary data. For example, if a player obtains an item in a game, data showing the item may be attached as the binary data to an item of the posted information.

In step S245, game application 53 obtains attribute information used for the posted information. In step S246, game application 53 transmits an item of posted information to post server 20. Before transmitting the item of the posted information, game application 53 adds to the item of the posted information the binary data generated in step S244 and identification information of game application 53. The subject posted information includes a set of binary data generated in step S244, and the attribute information generated in step S245.

In step S247, post server 20 records the received posted information into posted information database 212, along with the received identification information of game application 53. As already described, game application 53 transmits a request for transmitting the posted information. The request includes identification information of game application 53. In response to the request, post server 20 extracts (in step S248) posted information that corresponds to the identification information from posted information database 212. Post server 20 generates (in step S249) data showing the extracted posted information in a predetermined format. Post server 20 transmits (in step S250) the generated data to information-processing device 10 that is the source of the request. Game application 53 displays (in step S251) an image in accordance with the data received from post server 20. More specifically, game application 53 executes a process relating to the game, using the received binary data. It is to be noted that game application 53 may display the received text included in the posted information together with a relationship with the binary data. Details of steps S247 to S251 are similar to those of steps S226 to S230.

3-1-2-2-3. Posting Direct Message

Figure 19:
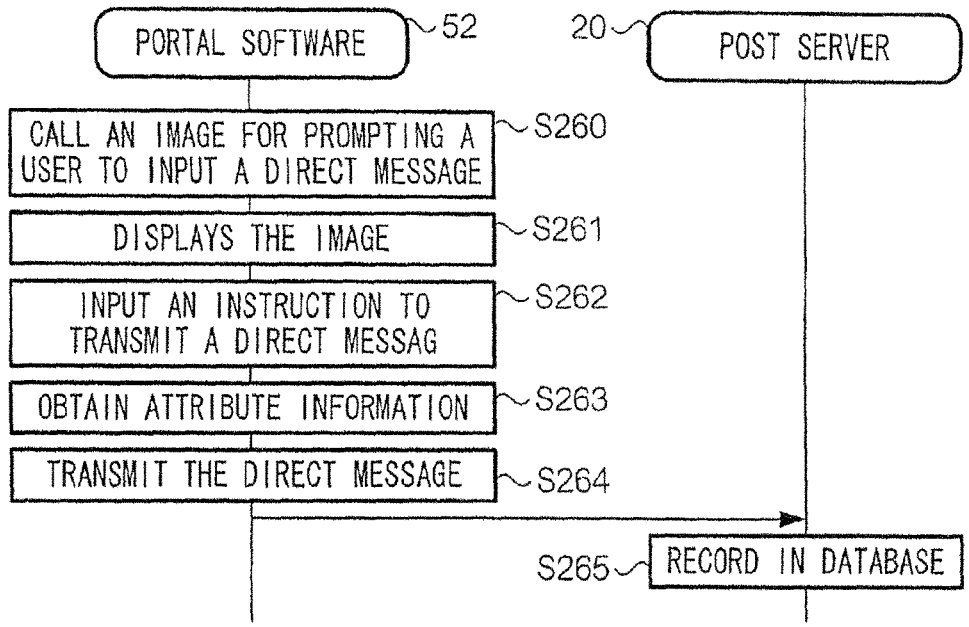
FIG. 19 shows an example of a sequence chart illustrating a process for posting a direct message.

FIG. 19 shows an example of a sequence chart illustrating a process for posting a direct message. Here, description will be given for an example in which portal software 52 posts a direct message. In step S260, portal software 52 calls an image for prompting a user to input a direct message. The calling of the image is triggered by a predetermined event, for example, a predetermined command is input via portal software 52.

In step S261, portal software 52 displays the image for prompting a user to input a direct message. The image includes a box for inputting an ID of a user to whom the direct message is sent, and another box for inputting a message. After completing the input of the message, the user instructs (in step S262) to transmit the direct message. In step S263, portal software 52 obtains attribute information used for the direct message. According to this example, the user ID of the sender (source) and the user ID of the destination, are used as the attribute information. In step S264, portal software 52 transmits the direct message to post server 20 via access module 514. The direct message includes the attribute information obtained in step S263. In step S265, the direct message is recorded in posted information database 212.

3-1-2-3. Downloading Data

Figure 20:
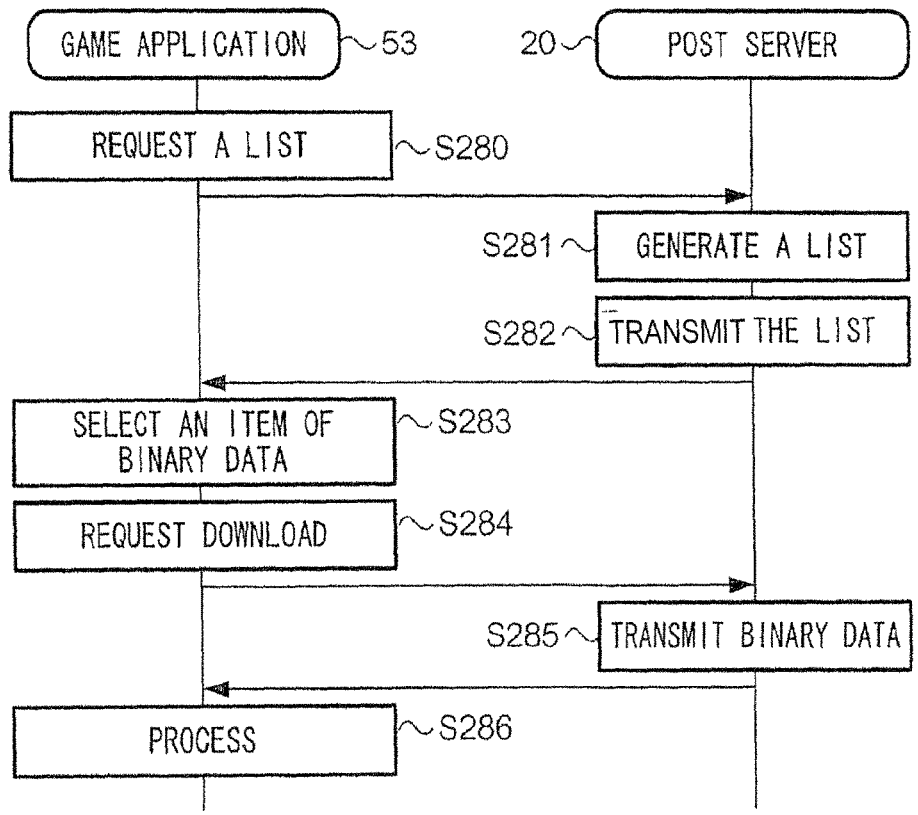
FIG. 20 shows an example of a sequence chart illustrating a process for downloading data.

FIG. 20 shows an example of a sequence chart illustrating a process for downloading data. Here, description will be given for an example where game application 53 downloads binary data uploaded to post server 20. The binary data is uploaded, for example, in accordance with a process shown in FIG. 18.

In step S280, game application 53 transmits a request for transmitting a list of data that is ready to be downloaded, to post server 20. Hereinafter, the request is referred to as a "list request." The list request includes the application ID of game application 53.

When post server 20 receives the list request, post server 20 extracts, from among plural items of binary data recorded in posted information database 212, at least a part of attribute information (for example, post ID, timestamp, and username) corresponding to the binary data relating to the application ID included in the received list request. In other words, if an application program accesses post server 20, post server 20 extracts binary data generated by the same application program. The binary data is generated by the same application program that posts the posted information. Here, the number of items of the binary data is predetermined. Post server 20 generates (in step S281) a list of binary data by using the extracted attribute information. Hereinafter, the list is referred to as a "data list." The data list includes, for example, username, timestamp, and usage information. Post server 20 transmits (in step S282) the generated data list to information-processing device 10 that is the source of the list request. Post server 20 may transmit items of the posted information to which the extracted binary data corresponds.

When game application 53 receives the data list, game application 53 displays an image for prompting a user to select at least one item of binary data from the received data list. At this time, game application 53 may display the posted information corresponding to the displayed binary data. Game application 53 selects (in step S283) at least one item of binary data in response to an instruction input by a user via input module 104. Game application 53 transmits (in step S284) a request for downloading the selected items of binary data to post server 20. The request includes identification information (for example, a post ID) for identifying an item of binary data.

When post server 20 receives the request for download, post server 20 extracts items of binary data corresponding to the post ID included in the request, from among items of binary data recorded in posted information database 212. Post server 20 transmits (in step S285) the extracted items of binary data to information-processing device 10 that is the source of the request.

When game application 53 receives the binary data, game application 53 executes a process using the received binary data. For example, in a case that the binary data is data showing an item used in a game, a user can use the item in the game.

3-2. Methods for Accessing Posted Information Sharing Service when the Game Application is not being Executed.

Information-processing device 10 may access the posted information sharing service when game application 53 is not being executed; for example, before game application 53 is started up and after information-processing device 10 is turned on. In such a case, a user instructs to start up portal software 52.

As already described, in a case that portal software 52 is started up when game application 53 is being executed, portal software 52 accesses a community having a URL notified by OS 511. However, in this example, a URL is not notified by OS 511. According to this example, portal software 53 transmits a request for accessing post server 20 without identifying a specific community. More specifically, portal software 52 transmits a request for accessing a home directory of post server 20, for example.

If post server 20 receives a request for access without identifying a community, post server 20 refers to user configuration information. The user configuration information includes information foe identifying items included in a home image of the posted information sharing service. In the home image of the posted information sharing service, items of posted information posted by all friends of the user is displayed in an order that they are timestamped. Further, the home image includes a list of all communities or a part of a community that satisfies a predetermined condition (for example, communities to which the user belongs). Post server 20 generates data showing the home image. Post server 20 transmits the generated data to information-processing device 10 that is the source of the request. The data includes URLs of communities included in the list.

When portal software 52 receives data showing the home image, portal software 52 displays the home image in accordance with the received data. If the user selects one community from the list shown in the home image, portal software 52 transmits to post server 20 a request for accessing the selected community.

When post server 20 receives a request for access, post server 20 extracts items of the posted information satisfying the condition for restricting the posted information, from posted information database 212. Post server 20 generates data showing the extracted items of the posted information. Posted information 20 transmits the generated data to information-processing device 10 that is the source of the request. Details of these processes are similar to those of steps S107 to S109.

The image displayed in accordance with data transmitted from post server 20 includes a text box for inputting a text, and a button for instructing to post the text. If a user inputs a text and pushes the button, portal software 52 obtains attribute information used in the posted information, similarly to a process in step S224. However, in this case, since an application program being executed does not exist, portal software 52 obtains an application ID of the application program corresponding to the community currently being accessed. The application ID is notified from post server 20 and is held by portal software 52.

The obtained attribute information is as described in step S224. However, in this example, usage information of the application program corresponding to the community being currently accessed may not be stored in memory 102. In such a case, portal software 52 transmits to post server 20 posted information without usage information or with usage information having a null value.

Post server 20 records the received item of the posted information in posted information database 212. For an item of posted information without usage information or with usage information having a null value, post server 20 records usage information having a null value in posted information database 212.

Post server 20 again extracts items of posted information that satisfy the condition for restricting the posted information. Post server 20 generates data showing the extracted items of the posted information. Post server 20 transmits the generated data to information-processing device 10 that is the source of the request. Details of these processes are similar to those of steps S107 to S109.

With regard to the plural items of posted information recorded in posted information database 212, there are two types of usage information: one is usage information having a value other than null; and the other is usage information having a null value. Information-processing device 10 displays the non-null usage information to have a different appearance from null usage information. In other words, information-processing device 10 displays the items of the posted information including non-null usage information to have a different appearance from the posted information including null usage information. The different appearance is, for example, a different color of at least one of characters, a user image, and a text. As another example, the different appearance is a different font of at least one of characters and a text. As yet another example, the different appearance is a different image to be added to the posted information; for example, a mark or an icon.

According to the example, a user who accesses a community of game application 53 can easily determine whether a text is posted by a user who has played the game or a user who has not played the game, compared with a case where these users are not distinguished.

It is to be noted that, if there is no application program being executed (or suspended), portal software 52 may transmit to post server 20 an item of posted information including no application ID (or a null application ID). In such a case, post server 20 records in posted information database 212 the received item of the posted information along with an application ID corresponding to the accessed community.

4. Modification

The technology is not restricted to the embodiment described above. Various modifications can be applied to the exemplary embodiment. Some modifications will be described below. Two or more modifications from among the following modifications may be combined.

4-1. First Modification

The first program and the second program are not restricted to examples described in the above embodiments. For example, each of the first program and the second program may be a client program for accessing the posted information sharing service. Alternatively, each of the first program and the second program may be a game program.

4-2. Second Modification

The software configuration of information-processing device 10 is not restricted to the example described in the embodiment. For example, in the above embodiment, access module 514 is included in the system software. However, an access module may be included in an application program. In another example, system software 51 may include a function corresponding to portal software 52. As long as the functions shown in FIG. 4 are implemented, assignment of the functions to an application program and the system software may be performed by any method. Alternatively, a single program may include all the functions described above.

4-3. Third Modification

A method for identifying the application program being executed, is not restricted to the example described in the above embodiment. In the above embodiment, description is given of an example in which OS 511 monitors the application program being executed, and application identifying module 512 identifies the application program being executed by the application ID notified by OS 511. However, the application program may notify its own application ID to application identifying module 512. In another example, information-processing device 10 may transmit an inquiry of the application ID of the application program being executed, and may notify application identifying module 512 of the application ID that is notified by a server. In such a case, the server holds the application ID of the application program being executed by inquiring to the system software of information-processing device 10 or by inquiring to the application program, or by receiving notification from the system software or an application program.

4-4. Fourth Modification

At least a part of the functional elements shown in FIG. 4 may be omitted. For example, information-processing device 10 may not include identification-generating unit 17. In such a case, the application ID obtained by information-processing device 10 may be the URL itself or a part of the URL.

4-5. Fifth Modification

Information-processing device 10 may have a function to execute plural application programs in parallel, a so-called multi task function. In this case, information-processing device 10 identifies as the application program being executed one application program that is active (more specifically, is executed in the foreground, or is focused for inputting) at the timing when access to post server 20 is instructed, from among plural application programs parallelly executed.

4-6. Sixth Modification

Portal software 52 may be preinstalled in information-processing device 10. In other words, even in a case that portal software 52 is not the system software, portal software 52 may be installed when game application 53 is executed.

4-7. Seventh Modification

In the examples described in the above embodiment, there is no restriction for limiting access to a community. In other words, a user who has not used an application program can access a community of the application program. However, access control may be introduced so as to allow only users who have used an application program to access the community of the application program. Such access control may be provided for each community.

4-8. Other Modifications

Information-processing device 10 is not restricted to a console type game device. Information-processing device 10 may be a device other than a console type game device; for example, a portable game device, a personal computer, a mobile phone, a PDA (Personal Digital Assistant), or a tablet device. Further, an application program executed in information-processing device 10 is not restricted to a game application. The application program may be other than a game application; for example, a word processing application, educational application, or any other utility software.

The configuration of information-processing system 1 is not restricted to an example described in the above embodiment. For example, a server device other than post server 20 may include a part of functions of information-processing system 1. For example, the other server device may include storage unit 21. Further, an information-processing device other than information-processing device 10 may include a part of functions of information-processing system 1.

The posted information is not restricted to character strings or handwriting input by a user. For example, a fixed phrase stored in and provided by an application program may be used as the posted information.

Timing for transmitting the posted information from information-processing device 10 to post server 20 is not restricted to an example described in the above embodiment. For example, information-processing device 10 may automatically transmit the posted information when a predetermined condition is satisfied (for example, when a predetermined event occurs or a game parameter reaches a predetermined threshold).

The sequence charts and the flow charts described in the above embodiment are merely examples. The order of processes is not restricted to examples described in the sequence charts and the flow charts.

The hardware configuration of information-processing device 10 is not restricted to an example described in FIG. 7. Information-processing device 10 may have any hardware configuration as long as it is capable of implementing the functional configuration described in FIG. 4.

The device configuration of information-processing system 1 and allocation of functions to each device are not restricted to an example described in the above embodiment.

For example, a server device may include at least a part of functions of information processing device 10. In such a case, functions of information-processing device 10 may be implemented by a processor of an information-processing device, a processor of a server device, and cooperation of the two processors. Allocation of the processes may be designed by those skilled in the art. Further, the server device of the information-processing device may be the same device as post server 20 or a different device.

An application program executed in information-processing device 10 is not restricted to a program provided by a storage medium. The application program may be provided via download using a network such as the Internet. Further, the system software of information-processing device 10 may be provided by a storage medium or via download.

What is claimed is:

1. An information-processing system comprising:
   a terminal comprising a computer processor, the terminal being at least configured to:
   execute an application program that is selected by a user from among a plurality of application programs; and
   a posted information storage that stores a plurality items of posted information, for sharing at least one item of the posted information with other users,
   wherein the plurality of application programs include a first application program and a second application program, and the first application program is a program that, upon execution, allows browsing an item of the posted information by accessing the posted information storage, the second application program being a program different from the first application program, the posted information storage storing each item of the posted information along with identification information of an application program, at least one item of the posted information stored along with identification information of the second application program including an item of attached data,
   wherein the computer processor of the terminal is further configured to:
   request the posted information storage to output an item of the posted information corresponding to identification information of an application program, upon receiving an instruction to show the requested item of the posted information while the first application program is being executed; and
   request the posted information storage to output the item of the attached data stored along with the identification information of the second application program, upon receiving an instruction to utilize the item of the attached data while the second application program is being executed,
   wherein the posted information storage is further configured to:
   transmit to the terminal the requested item of the posted information or the requested item of the attached data, and
   wherein the computer processor of the terminal is further configured to:
   receive the requested item of the posted information from the posted information storage and display the received item of the posted information while the first application program is being executed, and
   receive the requested item of the attached data and execute a process using the received item of the attached data while the second application program is being executed.

2. The information-processing system according to claim 1, wherein the posted information storage is further configured to perform:
   a posted information provision that obtains at least one item of the posted information regardless of identification information and provides the obtained at least one item of the posted information to users.

3. The information-processing system according to claim 2, wherein
   the posted information provision obtains the at least one item of the posted information along with corresponding identification information and provides to users the obtained item of the posted information along with the corresponding identification information.

4. The information-processing system according to claim 1, wherein
   the terminal is further configured to generate an item of the posted information corresponding to an application program when the application program is being executed by the terminal, and
   the posted information storage is further configured to store the generated item of the posted information along with the identification information of the application program being executed while the posted information is being generated.

5. The information-processing system according to claim 4, wherein
   the terminal is further configured to add game data generated by the application program being executed by the terminal to the generated item of the posted information, and
   the posted information storage is further configured to store the generated item of the posted information along with the generated game data.

6. The information-processing system according to claim 5, wherein the posted information storage is further configured to perform
   a posted information provision that obtains at least one item of the posted information and game data regardless of identification information and provides the obtained item of the posted information to users, and
   the posted information provision displays the obtained item of the posted information, if game data is attached to the item of the posted information, having a predetermined appearance corresponding to the item of the posted information.

7. The information-processing system according to claim 1, wherein the item of the attached data is binary data representing an item obtained in the second application program by a user.

8. An information-processing device comprising a processor system including at least one processor, the information-processing device being at least configured to:
   execute an application program that is selected by a user from among a plurality of application programs,
   wherein the plurality of application programs include a first application program and a second application program, and the first application program is a program that, upon execution, allows browsing an item from a plurality items of posted information stored in a posted information storage, the second application program being a program different from the first application program, each item of the posted information being stored along with identification information of an application program, at least one item of the posted information stored along with identification information of the second application program including an item of attached data;

request the posted information storage to output an item of the posted information corresponding to identification information of an application program, upon receiving an instruction to show the requested item of the posted information while the first application program is being executed;

request the posted information storage to output the item of the attached data stored along with the identification information of the second application program, upon receiving an instruction to utilize the item of the attached data while the second application program is being executed, receive the requested item of the posted information from the posted information storage and display the received item of the posted information while the first application program is being executed, and receive the item of the attached data from the posted information storage and execute a process using the received item of the attached data while the second application program is being executed.

9. The information-processing device according to claim 8, wherein the item of the attached data is binary data representing an item obtained in the second application program by a user.

10. An information-processing method in an information-processing system including
   a terminal that executes an application program that is selected by a user from among a plurality of application programs, and a posted information storage that stores a plurality items of posted information, for sharing at least one item of the posted information with other users,
   wherein the plurality of application programs include a first application program and a second application program, and the first application program is a program that, upon execution, allows browsing an item of the posted information by accessing the posted information storage, the second application program being a program different from the first application program, the posted information storage storing each item of the posted information along with identification information of an application program, at least one item of the posted information stored along with identification information of the second application program including an item of attached data,
   the method comprising:
   requesting, by the terminal, the posted information storage to output the item of the attached data stored along with the identification information of the second application program, upon receiving an instruction to utilize the item of the attached data while the second application program is being executed;
   transmitting to the terminal, by the posted information storage, the requested item of the attached data;
   receiving, by the terminal, the requested item of the attached data; and
   executing, by the terminal, a process using the received item of the attached data while the second application program is being executed.

11. The information-processing method according to claim 10, wherein the item of the attached data is binary data representing an item obtained in the second application program by a user.

12. A computer-readable non-transitory storage medium storing a program causing a computer device to execute a process, the process comprising:
   executing an application program that is selected by a user from among a plurality of application programs, wherein the plurality of application programs include a first application program and a second application program, and the first application program is a program that, upon execution, allows browsing an item from a plurality items of posted information stored in a posted information storage, the second application program being a program different from the first application program, each item of the posted information being stored along with identification information of an application program, at least one item of the posted information stored along with identification information of the second application program including an item of attached data;
   requesting the posted information storage to output the item of the attached data stored along with the identification information of the second application program, upon receiving an instruction to utilize the item of the attached data while the second application program is being executed; and
   receiving the requested item of the attached data output from the posted information storage; and
   executing a process using the received item of the attached data while the second application program is being executed.

13. The computer-readable non-transitory storage medium according to claim 12, wherein the item of the attached data is binary data representing an item obtained in the second application program by a user.

14. An information-processing system comprising:
   a terminal including a computer processor, the terminal being configured to execute a first application program or a second game application program that is selected by a user from among a plurality of application programs; and
   a posted information storage that stores a plurality items of posted information, for sharing at least one item of the posted information with other users,
   wherein the first application program is a program that, upon execution, allows browsing an item of the posted information from a plurality items of posted information stored in a posted information storage, the second game application program being a game program different from the first application program, each item of the posted information being stored along with identification information of a game application program, at least one item of the posted information stored along with identification information of the second game application program including game data,
   wherein the computer processor of the terminal is further configured to:
   request the posted information storage to output an item of the posted information corresponding to identification information of a game application program, upon receiving an instruction to show the requested item of the posted information while the first application program is being executed; and
   request the posted information storage to output the game data stored along with the identification information of the second game application program, upon receiving an instruction to utilize the game data while the second game application program is being executed, wherein the posted information storage is further configured to:
  transmit to the terminal the requested item of the posted information or the requested game data, and
wherein the computer processor of the terminal is further configured to:
  receive the requested item and display the received item of the posted information while the first application program is being executed; and
  receive the requested game data and execute a process using the received game data while the second application program is being executed.

15. The information-processing system according to claim 14, wherein
  the terminal is further configured to generate an item of the posted information corresponding to a game application program when the game application program is being executed by the terminal, and add game data generated by the game application program being executed by the terminal to the generated item of the posted information.

16. The information-processing system according to claim 14, wherein
  the terminal is further configured to use the received game data in accordance with its relationship to the at least one item of the posted information corresponding to the second game application program.

17. An information-processing device comprising a processor system including at least one processor, the information-processing device being at least configured to:
  execute a first application program or a second game application program, wherein the first application program is a program that, upon execution, allows browsing an item of the posted information from a plurality items of posted information stored in a posted information storage, the second game application program being a game program different from the first application program, each item of the posted information being stored along with identification information of a game application program, at least one item of the posted information stored along with identification information of the second game application program including game data;
  request the posted information storage to output an item of the posted information corresponding to identification information of a game application program, upon receiving an instruction to show the requested item of the posted information while the first application program is being executed; and
  request the posted information storage to output the game data stored along with the identification information of the second game application program, upon receiving an instruction to utilize the game data while the second game application program is being executed,
  receive the requested item of the posted information from the posted information storage and display the received item of the posted information while the first application program is being executed, and
  receive the requested game data from the posted information storage and execute a process using the received game data while the second game application program is being executed.

18. An information-processing method in an information-processing system including a terminal that executes a game application program that is selected by a user from among a plurality of game application programs and a posted information storage that stores a plurality items of posted information, for sharing at least one item of the posted information with other users, the method comprising:
  executing, by the terminal, a first application program or a second game application program, wherein the first application program is a program that, upon execution, allows browsing an item of the posted information from a plurality items of posted information stored in a posted information storage, the second game application program being a game program different from the first application program, each item of the posted information being stored along with identification information of a game application program;
  storing, by the posted information storage, at least one item of the posted information along with identification information of the second game application program, the at least one item of the posted information including game data and information showing a relationship between the game data and the at least one item of the posted information;
  requesting, by the terminal, the posted information storage to output the game data stored along with the identification information of the second game application program, upon receiving an instruction to utilize the game data while the second game application program is being executed,
  obtaining, by the terminal, the game data output from the posted information storage; and
  using, by the terminal, the obtained game data to execute a process while the second game application program is being executed.

19. A computer-readable non-transitory storage medium storing a program causing a computer device to execute a process, the process comprising:
  executing a first application program or a second game application program, wherein the first application program is a program that, upon execution, allows browsing an item of the posted information from a plurality items of posted information stored in a posted information storage, the second game application program being a game program different from the first application program, each item of the posted information being stored along with identification information of a game application program, at least one item of the posted information stored along with identification information of the second game application program including game data;
  requesting the posted information storage to output the game data stored along with the identification information of the second game application program, upon receiving an instruction to utilize the game data while the second game application program is being executed,
  obtaining the game data output from a posted information storage; and
  using the obtained game data to execute a process while the second game application program is being executed.

20. An information-processing system comprising a processor system including at least one processor, the information-processing system at least being configured to:
  access a service for providing posted information, the posted information being input by users;
  selectively execute an application program that is selected by a user from among a plurality of application programs, wherein the plurality of application programs include a first application program and a second application program, and the first application program is a program that, upon execution, allows browsing an item of the posted information by accessing the storage, the second application program being a program different from the first application program;
store a plurality of items of the posted information in a storage, and a plurality of items of data that are attached to at least a part of the plurality of items of the posted information, each item of the posted information being stored along with identification information of an application program;
request the storage to output an item of the attached data stored along with identification information of the second application program, upon receiving an instruction to utilize the item of the attached data while the second application program is being executed; and
execute a process using the received item of the attached data while the second application program is being executed.

21. An information-processing device comprising a computer processor, the information-processing device being configured to at least perform:
a posted information provision that accesses a service for providing posted information, the posted information being input by users;
an execution that selectively executes an application program that is selected by a user from among a plurality of application programs, wherein the plurality of application programs include a first application program and a second application program, and the first application program is a program that, upon execution, allows browsing an item of the posted information by accessing the storage, the second application program being a program different from the first application program;
a storage that stores a plurality of items of the posted information, and a plurality of items of data that are attached to at least a part of the plurality of items of the posted information, each item of the posted information being stored along with identification information of an application program;
the execution requests the storage to output an item of the attached data stored along with identification information of the second application program, upon receiving an instruction to utilize the item of the attached data while the second application program is being executed; and
the execution executes a process using the received item of the attached data while the second application program is being executed.

22. An information-processing method comprising:
accessing a service for providing posted information, the posted information being input by users;
selectively executing an application program that is selected by a user from among a plurality of application programs, wherein the plurality of application programs include a first application program and a second application program, and the first application program is a program that, upon execution, allows browsing an item of the posted information by accessing the storage, the second application program being a program different from the first application program;
storing in a storage a plurality of items of the posted information, and a plurality of items of data that are attached to at least a part of the plurality of items of the posted information, each item of the posted information being stored along with identification information of an application program;
requesting the storage to output an item of the attached data stored along with identification information of the second application program, upon receiving an instruction to utilize the item of the attached data while the second application program is being executed; and
executing a process using the received item of the attached data while the second application program is being executed.

23. A computer-readable non-transitory storage medium storing a program causing a computer device to execute a process, the process comprising:
accessing a service for providing posted information, the posted information being input by users;
selectively executing an application program that is selected by a user from among a plurality of application programs,
wherein the plurality of application programs include a first application program and a second application program, and the first application program is a program that, upon execution, allows browsing an item of the posted information by accessing the storage, the second application program being a program different from the first application program;
storing in a storage a plurality of items of the posted information, and a plurality of items of data that are attached to at least a part of the plurality of items of the posted information, each item of the posted information being stored along with identification information of an application program;
requesting the storage to output an item of the attached data stored along with identification information of the second application program, upon receiving an instruction to utilize the item of the attached data while the second application program is being executed; and
executing a process using the received item of the attached data while the second application program is being executed.

* * * * *